United States Patent
Parker et al.

(10) Patent No.: US 7,143,344 B2
(45) Date of Patent: Nov. 28, 2006

(54) TRANSFORMATION STYLESHEET EDITOR

(75) Inventors: Charles W. Parker, Sammamish, WA (US); Robert J. Mauceri, Seattle, WA (US); Terrence R. Crowley, Woodinville, WA (US); Russell M. Sasnett, Kirkland, WA (US); Zhenguang Chen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 373 days.

(21) Appl. No.: 10/170,282

(22) Filed: Jun. 12, 2002

(65) Prior Publication Data

US 2003/0237046 A1    Dec. 25, 2003

(51) Int. Cl.
    *G06F 15/00* (2006.01)
(52) U.S. Cl. ............. 715/513; 715/513; 715/517; 715/530
(58) Field of Classification Search ........... 715/513, 715/500, 522; 707/10, 513
See application file for complete search history.

(56) References Cited

U.S. PATENT DOCUMENTS

| | | | |
|---|---|---|---|
| 6,601,057 B1 * | 7/2003 | Underwood et al. | 707/1 |
| 6,643,652 B1 * | 11/2003 | Helgeson et al. | 707/10 |
| 6,687,873 B1 * | 2/2004 | Ballantyne et al. | 715/500 |
| 6,799,299 B1 * | 9/2004 | Li et al. | 715/513 |
| 2001/0044811 A1 * | 11/2001 | Ballantyne et al. | 707/513 |
| 2002/0073236 A1 * | 6/2002 | Helgeson et al. | 709/246 |
| 2002/0085020 A1 * | 7/2002 | Carroll | 345/700 |
| 2003/0135825 A1 * | 7/2003 | Gertner et al. | 715/513 |
| 2004/0205551 A1 * | 10/2004 | Santos | 715/513 |
| 2004/0205571 A1 * | 10/2004 | Adler et al. | 715/513 |

OTHER PUBLICATIONS

Floyd, Michacle "Turn XML into HTML" Jun. 5, 2001 Published by PC Magazine pp. 1-4.*
"XSLT Designer." n.d. 4pp. Available http://www.xmlspy.com/products_xsl.html.
"XSL Editor and XSLT Editor." n.d. 4pp. Available http://xsl.xmlspy.com.
"XML Editor with Intelligent Editing." n.d. 1pg. Available http://www.xmlspy.com/features_editing.html.
"XSL Stylesheet Editor Technology Preview." 2000. 7pp. Available http://www7.software.ibm.com/vad.nsf/Data/Document4639.
"Stylus Studio Product Information." 2002. 3pp. Available http://www.exceloncorp.com/products/stylusstudio/productinfo.asp-?page=3.

* cited by examiner

Primary Examiner—William Bashore
Assistant Examiner—Quoc A. Tran
(74) Attorney, Agent, or Firm—Ronald M. Anderson

(57) ABSTRACT

Data in a document are displayed according to a transformation stylesheet, and the transformation stylesheet is automatically updated in response to a document modification made using a graphical editor. Mapping between the transformation stylesheet and the document is automated, so that user modifications to the document or to the transformation stylesheet are automatically incorporated in both. The transformation stylesheet is automatically annotated to create the mapping, and the data are transformed according to the annotated transformation stylesheet. Annotations are carried over to the resulting document. The annotations map nodes within the document to corresponding nodes in the transformation stylesheet. Annotations affected by modifications to the document are translated and replace corresponding nodes in the transformation stylesheet. The updated transformation stylesheet is re-annotated and the data are again transformed. Differences between the updated document and the original document are merged into the original document to maintain user selection information.

32 Claims, 15 Drawing Sheets

TRANSFORMATION STYLESHEET EDITOR

FIELD OF THE INVENTION

This invention generally relates to enabling a user to graphically modify a transformation stylesheet, and more particularly, to automatically propagating changes bi-directionally between an output document and a corresponding transformation stylesheet.

BACKGROUND OF THE INVENTION

A transformation stylesheet defines how to transform a source document into an output document. For instance, an eXtensible Stylesheet Language (XSL) stylesheet has a set of rules that determine how to transform a source eXtensible Markup Language (XML) document into an output document. The output document may also be an XML document, or may be another type of document, such as a Hypertext Markup Language (HTML) document, or a Portable Document Format (PDF) document. Typically, an XSL stylesheet defines the formatting style of the output document, such as text color, line spacing, etc. However, the XSL stylesheet may also define alterations that transform the structure of the source document into a different structure. For example, the structure of nodes in a source XML document may be transformed according to the XSL stylesheet to produce an output XML document with nodes arranged in a different order, or replaced with different nodes altogether. Similarly, the structure of a source XML document may be transformed according to the XSL stylesheet to produce an output HTML document that is structurally different and not just translated into HTML. Thus, a source document can not only be transformed into an output document according to formatting rules that are included in an XSL stylesheet, but more broadly, the XSL stylesheet can be used to transform the source document in many other aspects, beyond just formatting.

Unfortunately, the term "stylesheet" is somewhat inadequate to describe the capabilities of an XSL stylesheet, because an XSL stylesheet can clearly include rules for more than just formatting style. The term is further complicated by the fact that the acronym "XSL" is commonly used to refer to a group of related technologies, including XSL Transformations (XSLT), XPath, and XSL Formatting Objects. Details regarding the differences between these related technologies are not significant here; however, further information is available through the World Wide Web Consortium (W3C) website http://www.w3.org/Style/XSL/. Despite the apparent inadequacies of the terminology, the term "stylesheet" in the context of XSL is commonly understood in the art to include rules for all types of transformation, and it is intended that the broader aspect of the term shall apply herein, in accord with this common understanding.

Transformation rules provided in an XSL stylesheet are particularly useful, because an XSL stylesheet can be employed to transform various source documents containing different information into a single desired uniform output structure and format. An XSL stylesheet is also especially useful for transforming a large amount of source data into a structure and format desired for display in a Web browser program.

Because of the misleading terminology applied in naming it, an XSL stylesheet might be viewed as an XML equivalent to a Cascading StyleSheet (CSS). However, although a CSS is well suited for formatting, it is not well suited for defining structural transformations. Thus, a CSS is not equivalent to an XSL stylesheet. To better understand the differences, it is instructive to review how a CSS is used, and review the relationship between the CSS and the output document. An entire CSS is often embedded as a section of a source HTML document. Alternatively, CSS elements may be integrated into a source HTML document in an "in-line" manner. In any case, formatting is accomplished as defined by the CSS while the source HTML document is being rendered by the Web browser. Such integration makes it relatively easy to update a CSS while modifying a source HTML document in a text or graphical editor. However, this integration makes it difficult to apply the same CSS to multiple source documents to achieve a desired consistent result. A CSS can also be a separate document that is linked to a source HTML document. However, it is difficult to ensure that the CSS still provides a desired formatting when changes are made to the source HTML document, especially when structural changes are made to the source HTML document. Since XSL stylesheets can define structural transformations in addition to formatting, it is easier to modify only an XSL stylesheet so that the source document is transformed into an output document that is rendered as desired.

Because, an XSL stylesheet defines a transformation, a one-way mapping exists between an XSL stylesheet and an output document produced by it. Some current systems utilize this mapping in a graphical user interface (GUI) to ease development of XSL stylesheets. For example, a product called STYLUS STUDIO™ by Excelon Corporation includes a visual stylesheet editing mode. XSL stylesheets can be built using a drag and drop interface that supports JAVA™ extension functions for data conversion. The interface provides a graphical mapping between a text window showing a tree structure of the XSL stylesheet code and another text window showing a tree structure of the output document code. This mapping may be useful for sophisticated users familiar with XSL code, but also tends to limit the benefits of XSL stylesheets to such users. It is thus desirable to provide an interface that does not require an understanding of code, so that a wider range of users can benefit from XSL stylesheets for generating output documents in a desired structure and format. Specifically, it would be desirable to provide an interface that enables an unsophisticated user to readily develop an XSL stylesheet.

Another product called XML SPY XSLT DESIGNER™ by Altova GmbH provides a GUI that presents an XSL stylesheet in a graphical form, in a main design window. From a data source window, a user can drag and drop XML data elements into the main design window. The main design window presents the XML data element and enables the user to add presentation tags, such as tables, hyperlinks, and graphics. A resulting stylesheet is automatically generated from the graphical representation in the main design window. The user can then apply the stylesheet to a data source (displayed as a tree in the data source window), enabling the user to preview an output document with a built-in browser. Thus, XML SPY XSLT DESIGNER enables a user to graphically create an XSL stylesheet and preview an output document. However, such a system still requires a relatively sophisticated user that understands XSL stylesheets enough to work on an XSL stylesheet itself, even though the XSL stylesheet is in graphical form. Moreover, the preview capability is limited to the one-way mapping of the XSL stylesheet, which is no different than a standard browser that renders the output document according to the XSL stylesheet. It would be desirable to empower a broader range of users by providing a GUI that enables unsophisticated users to simply indicate a desired output form and structure and propagate the desired output back into an XSL stylesheet without having to understand how the XSL stylesheet transforms a source document to achieve the desired output in a document.

Because an XSL stylesheet is directly related to a rendered output document, it would further be desirable to enable a two-way mapping, so that a user can make changes to a rendered output document and propagate those changes back into an XSL stylesheet. Transforming a source document according to an XSL stylesheet is a one-way operation that requires the source document to be an XML document. Thus, a two-way mapping would require maintaining the mapping as changes are made to the output document. Such reverse propagation would empower a broad range of unsophisticated users to make structural and formatting changes to one output document through a GUI and propagate those changes back to the XSL stylesheet so that the XSL stylesheet could be applied to transforming a number of source documents.

One attempt at such a GUI is an XSL stylesheet editor under development by International Business Machines Corp. (IBM). The IBM editor provides a "What You See Is What You Get" (WYSIWYG) user interface that displays an output document created by transforming sample XML data according to an XSL stylesheet. However, the IBM editor is not a true two-way system. A user can add objects to an output document, but the addition does not first affect the output document and then propagate back into the XSL stylesheet. Instead, the IBM editor simply determines where the objects should be added in the XSL stylesheet, and directly modifies the XSL stylesheet. For example, if the user wishes to insert text at a given place, the user needs to select a stylesheet template, choose a position in the XML tree below the template, and choose a menu command, such as insert text. The IBM editor uses the output document as a reference, but does not actually propagate changes in the output document back to the XSL stylesheet. The result is an unnatural usage for users who are not familiar with the structure of XSL stylesheets. It is preferable to enable the user to choose a point in the output of the transform and type. This simple process is very natural and intuitive to a broad range of users, because it is the same process used for word processing, which is very familiar to a majority of users. The prior art cannot provide this simple approach, because there is no reverse-propagation mechanism, which would enable a user to provide input directly to a preview window and determine precisely where the input should go in the transformation stylesheet. In short, the prior art does not enable a user to modify an output document through a WYSIWYG editor, and have the modification propagate back to the transformation stylesheet.

SUMMARY OF THE INVENTION

The present invention is directed to a method and system for displaying data in a document according to a transformation stylesheet, and enabling a user modification of the document to automatically update the transformation stylesheet. Similarly, a user modification of the transformation stylesheet automatically updates the document. Thus, the present invention provides means for automatically mapping modifications of the document back to the transformation stylesheet, and for automatically mapping modifications of the stylesheet into the document. A preferred embodiment takes the form of an editor having a GUI that enables a broad range of relatively unsophisticated users to accomplish the mappings of such modifications, without requiring that users have programming skills. The invention also maintains selection data, so that the user interface is generally consistent with conventional editors. The selection data are maintained by mapping the modifications rather than simply replacing the transformation stylesheet or replacing the document.

To establish a mapping and display data in a document according to a transformation stylesheet, such that a user modification of the document automatically updates the transformation stylesheet, a preferred embodiment for the editor first associates the data with the document, and determines a structure of the data. Based on the determined structure, the editor accesses a transformation stylesheet that corresponds to the structure that was thus determined. The transformation stylesheet may define a structure, a format, and/or other characteristics for displaying the data. The editor then annotates the transformation stylesheet to create the mapping between the transformation stylesheet and the resulting document. The data are transformed according to the annotated transformation stylesheet to generate a data view for the document. The data view is encoded in a coding language that is compatible with that of the document and also includes one or more annotations that are carried over from the annotated transformation stylesheet, to map locations within the document to corresponding locations in the transformation stylesheet. The editor can render the data view along with the rest of the document with an interface that provides menu functions and dialog boxes to easily implement modifications to the document and corresponding transformation stylesheet. The annotated transformation stylesheet preferably complies with XSL specifications.

The annotations in the transformation stylesheet and corresponding document reflect the identities, certain attributes or other elements, and locations of original nodes in the transformation stylesheet. In addition, the annotations may include other transformation instructions for aiding the mapping. The data are transformed according to the original transformation nodes and the additional instructions via a standard transformation engine. Nonfunctional portions of the annotations are passed through to the resulting document as document annotations, along with the identities, elements, and locations of the original nodes.

When a user modifies a portion of the document, such as a portion of the data view, the editor automatically updates the transformation stylesheet by identifying the document annotations that are affected by the modification and propagating the affected annotations back into the transformation stylesheet. More specifically, the editor translates the affected document annotations into a code that is compatible with the transformation stylesheet and updates the corresponding original nodes of the transformation stylesheet with the code translated from the document annotations. To determine the affected document annotations, the editor evaluates a change region to an internal representation of the document. From the starting point of the change region, the editor walks up a tree structure of the document to find a template body annotation node encompassing the change region. The template body annotation node corresponds to a template of the transformation stylesheet. The editor then translates all document annotations encompassed by the template body annotation node into the code compatible with the transformation stylesheet, creating an updated template. Since the document annotations include the identities, elements, and locations of the corresponding original nodes in the transformation stylesheet, the editor replaces the original nodes of the original template with the new code of the updated template.

The above steps are thus applied to automatically update the transformation stylesheet. To complete the process of displaying the data according to the updated transformation stylesheet, the editor repeats the process of annotating the updated transformation stylesheet and transforming the data according to the updated annotated transformation stylesheet. However, to maintain the user's selection information, such as cursor location, the editor compares the previous version of the document with the newly updated version of the document to determine any differences between the two. The editor then merges the differences into the previous version of the document and renders the merged document.

BRIEF DESCRIPTION OF THE DRAWINGS FIGS.

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Operating Environment

Figure 1:
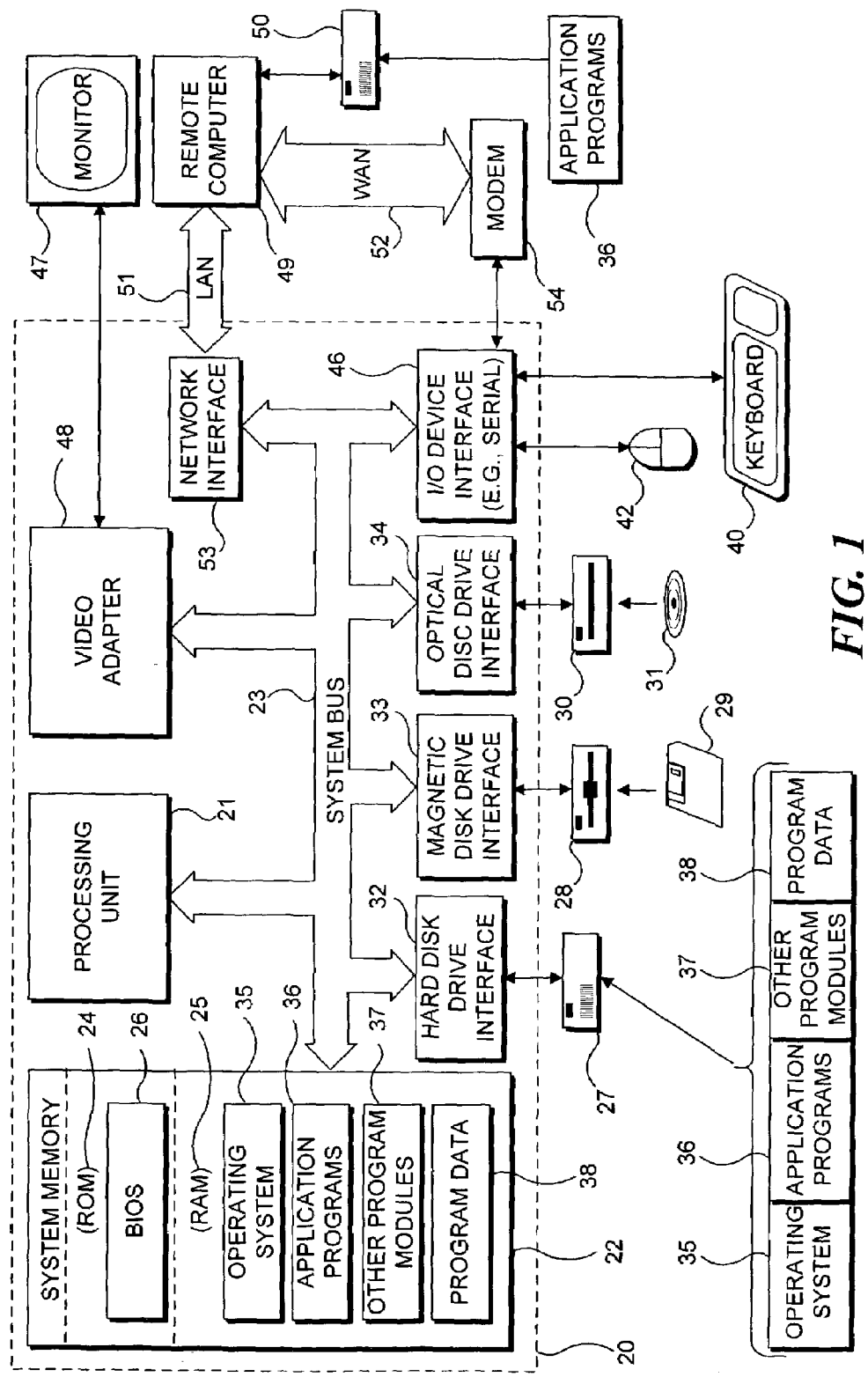
FIG. 1 is a block diagram of an exemplary system for implementing the present invention, using a general purpose computing device in the form of a conventional personal computer (PC)

FIG. 1 and the following discussion are intended to provide a brief, general description of a suitable computing environment in which the present invention may be implemented. The invention may be practiced on a single computing device, but can also be practiced on a client computing device coupled in communication with a server and/or one or more other remote computing devices over a communication network. Both the client computing device and the server will typically each include the functional components shown in FIG. 1. Although not required, the present invention will be described in the general context of computer executable instructions, such as program modules that are executed by a PC. Generally, program modules include application programs, such as computer simulations, routines, objects, components, functions, data structures, etc. that perform particular tasks or implement particular abstract data types. Also, those skilled in the art will appreciate that this invention may be practiced with other computer system configurations, particularly in distributed computing environments, where tasks are performed by remote processing devices that are linked through a communications network. In a distributed computing environment, program modules may be located in either or both local and remote memory storage devices.

With reference to FIG. 1, an exemplary system for implementing the present invention includes a general purpose computing device in the form of a conventional PC 20, which is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown) and may include a magnetic disk drive 28 for reading from or writing to a removable magnetic disk 29, and an optical disc drive 30 for reading from or writing to a removable optical disc 31, such as a CD-ROM or other optical media. Hard disk drive 27, magnetic disk drive 28, and optical disc drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein includes a hard disk, removable magnetic disk 29, and removable optical disc 31, it will be appreciated by those skilled in the art that other types of computer readable media, which can store data that are accessible by a computer, such as magnetic cassettes, flash memory cards, digital video disks (DVDs), Bernoulli cartridges, RAMs, ROMs, and the like, may also be used in the exemplary computing environment.

A number of program modules may be stored on the hard disk, magnetic disk 29, optical disc 31, ROM 24 or RAM 25, including an operating system 35, one or more application programs 36, other program modules 37, and program data 38. A user may enter commands and information into PC 20 through input devices such as a keyboard 40 and a pointing device 42. Pointing device 42 may include a mouse, stylus, wireless remote control, or other pointer. Other input devices (not shown) may include a joystick, game pad, wheel, pedal, microphone, satellite dish, scanner, digital camera, digital video recorder, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48, and is usable to display application programs, Web pages, a simulated environment, and/or other information. In addition to the monitor, PCs are often coupled to other peripheral output devices (not shown), such as speakers (through a sound card or other audio interface (not shown)), and printers.

As indicated above, the invention may be practiced on a single computing device; however, PC 20 may operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface, for establishing communications over WAN 52. One type of WAN commonly used for communication is the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Exemplary User Interface

A preferred embodiment of the present invention comprises a Web editor, such as Microsoft Corporation's FRONTPAGE™ Web editor. In this exemplary embodiment, the present invention expands upon capabilities of previous versions of the Web editor.

The Web editor provides a WYSIWYG user interface for developing, publishing, and maintaining Web sites. Information regarding the underlying capabilities is available at http://www.msdn.microsoft.com/library/default.asp?url=/nhp/Default.asp?contentid=2800 0550.

Figure 2:
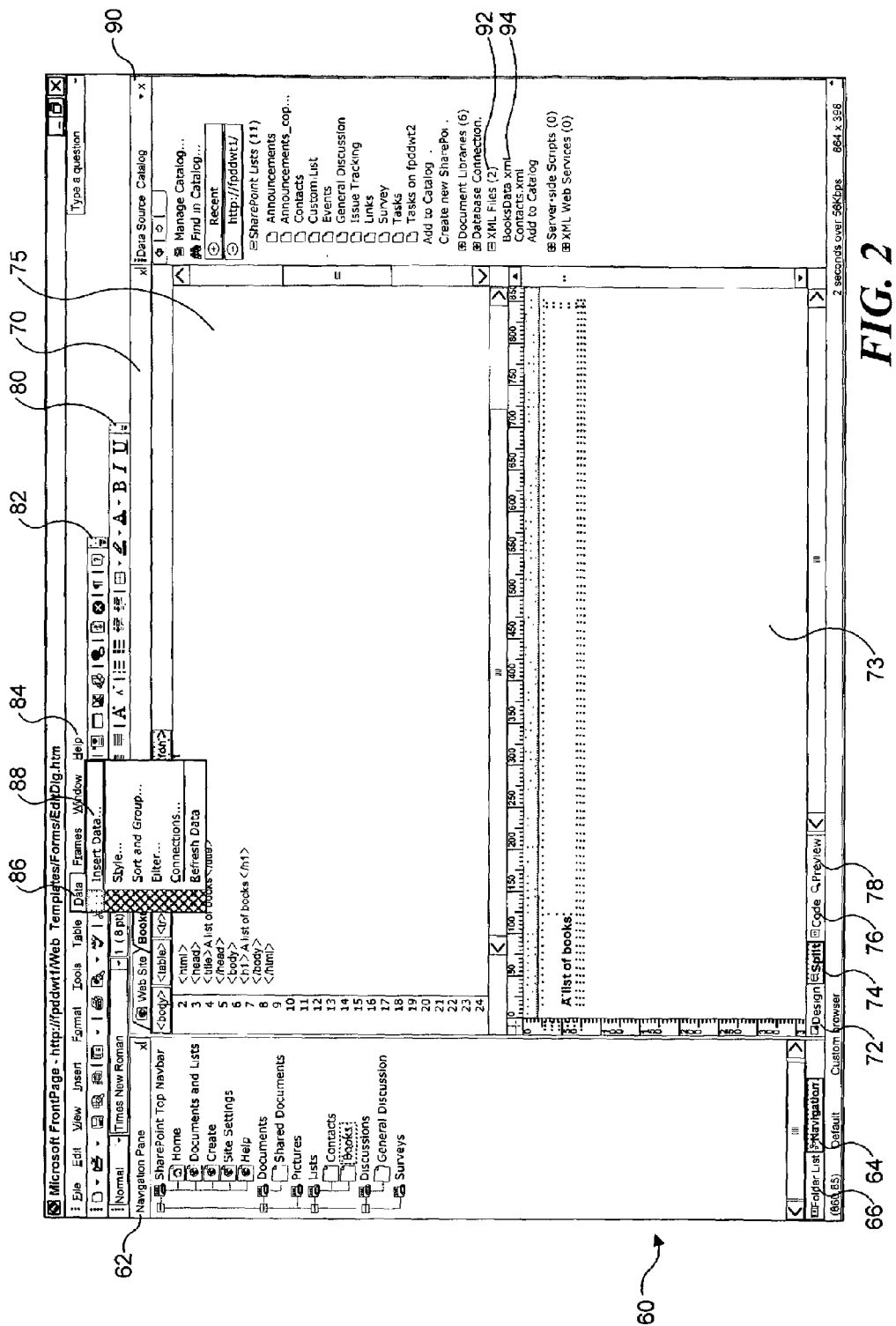
FIG. 2 is a screen print of a Web editor with an exemplary static Web document loaded.

FIG. 2 is a screen print of a WYSIWYG Web editor 60 with an exemplary static Web document loaded. Web editor 60 can provide multiple panes of information relevant to Website development. For example, Web editor 60 can display a navigation pane 62 that illustrates an overall structure of Web documents comprising a Website.

Navigation pane 62 can be displayed by selecting a navigation button 64. As an alternative, a user may select a folder list button 66 to display a list of folders and files selectable by the user. The user may selectively open a document via the folder list, navigation pane, or other traditional means for opening a Web document. Web editor 60 displays an open Web document in a work area 70. Multiple Web documents may be opened concurrently and may be selectively displayed in work area 70.

Also, a Web document may be displayed in at least four different view types. A user may select a design button 72 to display the Web document in a design view within entire work area 70. A example is illustrated by a half-size design view 73. The user may obtain the half-size view by selecting a split button 74 to divide work area 70 between multiple view types. Typically, selecting a split view displays design view 73 and a code view 75 of the same loaded Web document. Work area 70 can be entirely filled with a code view of the loaded Web document by selecting a code button 76. As another alternative, a user may select a preview button 78 to render the Web document in work area 70 to display the Web document as it appears when opened for display in a browser program.

Web editor 60 also includes one or more toolbars such as formatting toolbar 80 and standard function toolbar 82. As is well known, toolbars often provide a button corresponding to a function that is also available through a menu list 84. This embodiment of the present invention introduces a new data menu 86 that provides the user with means to manipulate source data that are associated with a Web document. Preferably, the source data are available in a storage separate from the currently open Web document. For example, the source data may be available in a separate file, a database, or other data store. The data store is typically referred to as a data source. Often such source data are dynamic, i.e., subject to change on a frequent basis. For example, a data source may store book order information and the status of book orders. Customers may add new book orders to the data source through a retail Website. Further, employees may change the status of each book order as the order is processed.

As discussed above, XSL is often used to transform source data into a desired format and a desired structure for display in a Web document. Data menu 86 provides functions for defining and modifying such data transformations for use in the currently open Web document. As with other menus, the functions of data menu 86 can also be performed via toolbar buttons when appropriate data related elements are selected.

Often, a user will first wish to associate source data with the currently open Web document. The user may select an insert data function 88 to establish this association. Selecting insert data function 88 preferably causes a task pane 90 to display a catalog of data sources. The user may organize the data source catalog as desired, and populate the catalog with any desired data sources. For example, the user may populate an XML subcategory 92 with XML files such as bookstore data file 94. Bookstore data file 94 may comprise the following simple XML code.

```xml
<?xml version='1.0'?>
<bookstore>
    <book>
        <author>Evelyn Waugh</author>
        <title>Sword of Honour</title>
        <category>Fiction</title>
        <price>12.99</price>
    </book>
    <book>
        <author>David McCullough</author>
        <title>John Adams</title>
        <category>Biography</title>
        <price>21.00</price>
    </book>
    <book>
        <author>J. R. R. Tolkien</author>
        <title>The Lord of the Rings</title>
        <category>Fiction</title>
        <price>22.99</price>
    </book>
    <book>
        <author>Nigel Rees</author>
        <title>Sayings of the Century</title>
        <category>Reference</title>
        <price>8.99</price>
    </book>
</bookstore>
```

The user may drag bookstore data file 94 from task pane 90 into work area 70 to associate bookstore data file 94 with the currently open Web document. Those skilled in the art will recognize that the data source catalog may be populated with a wide variety of other data sources, including SharePoint Team Services lists, document libraries, databases, server-side scripts, and XML Web services. Those skilled in the art will also recognize that task pane 90 may include selectable functions for managing, finding, and organizing data sources in the data source catalog.

Figure 3:
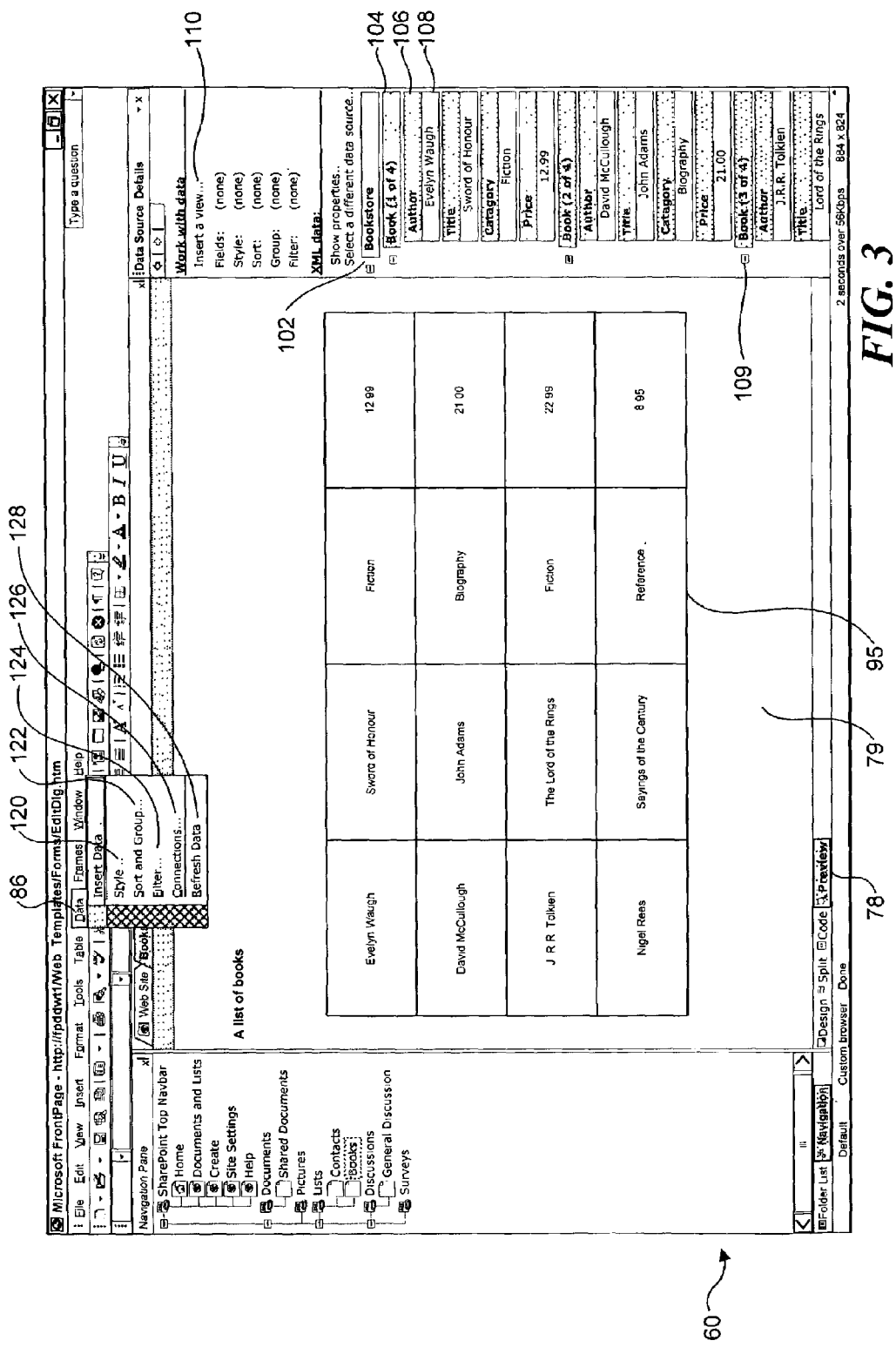
FIG. 3 is a screen print of the Web editor with the exemplary Web document displayed as it would appear when opened in a browser.

FIG. 3 is a screen print of Web editor 60 with an exemplary currently open Web document displayed as it would appear if displayed by a browser program. As discussed above, preview button 78 enables the user to switch to browser view 79. The currently open Web document includes a data view 95 that displays the source data from the XML data file associated with the currently open Web document. Data view 95 is preferably an HTML table populated with the source data and rendered according to a predefined XSL stylesheet.

Details of the data source file maybe displayed in a task pane 100 to aid in editing the currently open Web document. Preferably, the data source file is displayed as a data tree 102 comprising nodes, attributes, and values. For example, data tree 102 includes a node 104 defining book data. Node 104 includes an author attribute 106. In turn, author attribute 106 includes an author value 108. Those skilled in the art will recognize that any arrangement of nodes, attributes, values, and other elements may be provided by the data source. Also, it will be understood that task pane 100 may include common functions for selecting and displaying source data. For example, a user may hide or expand portions of data tree 102 with tree view buttons such as a hide/expand button 109. Task pane 100 also enables the user to work with the source data via parameters 110. Parameters 110 provide digest text and quick access to many of the functions discussed below that are available through data menu 86. The name or other appropriate value of each parameter 110 that was most recently applied to the stylesheet, is provided in this view.

Data menu 86 includes other functions to transform the source data for display in data view 95. Specifically, a style function 120 enables a user to set a view style for all or portions of data view 95. Style function 120 implements a number of templates for formatting the data view. For example, the template may be a simple record-oriented layout, such as tabular and stacked fields. Alternatively, a complex template may be implemented to transform multiple repeating data regions of the data source. Other styles include "form," "list," "comma-separated," etc. Thus, view styles may be combined to construct sophisticated layouts in a manner similar to SharePoint Team Services list view formats provided in Microsoft Corporation's FRONTPAGE 2002™ program. A related feature that is available through a separate menu is a conditional formatting feature. The conditional formatting feature allows conditions to be set on selected elements in the data view and for those elements to be shown, hidden, or have a formatting style applied to the selected elements based on the condition. The conditions and the accompanying style attributes are written into the XSL and applied when the XSL is processed. A sort and group function 122 enables the user to presort and pregroup the source data before the source data are displayed in data view 95. Similarly, a filter function 124 enables the user to prefilter the source data before the source data are displayed in data view 95. A connections function 126 enables the user to parameterize a second data view by using elements of source data from one data view as input to the second data view. This "connection" mechanism is part of a WebPart Framework, which the Web editor leverages to provide a server-side component for data views. A refresh data function 128 enables the user to obtain the most recent source data from the data source file and re-render the data in data view 95.

The above functions are performed by adding or modifying transformation instructions in an XSL stylesheet that is applied to the source data to generate data view 95. When the user chooses to insert source data into the currently open Web document via the insert data function, or by dragging and dropping the source file, the data are not directly inserted into the HTML code of the Web document. Instead, the Web editor selects an appropriate XSL stylesheet to transform the data source into data view 95 of the Web document. In this way, the source data can change dynamically, and the Web document will always be able to obtain and display the most recent source data from the data source file. Thus, the Web editor associates the XSL stylesheet with the Web document. The association may be implemented by embedding the XSL stylesheet into the Web document or by adding a reference to the Web document that identifies a separate XSL file. If the XSL stylesheet is embedded, the existing Web document effectively becomes the XSL stylesheet. For example, when the user inserted the bookstore data into the Web document to be displayed as data view 95, the Web editor would have merged the HTML code of the Web document with the elements of the predefined XSL stylesheet. The complete XSL stylesheet would then comprise the following code. The code embedded from the predefined XSL stylesheet is in bold font.

```
<xsl: stylesheet
                            xmlns:xsl=http://www.w3.org/1999/XSL/Transform
                            version="1.0">
    <xsl:template match="/">
        <html>
            <head>
                <title>A list of books</title>
            </head>
            <body>
                <h1>A list of books</h1>
                <table border="2">
                    <xsl:for-each select="//book">
                        <tr>
                            <td><xsl:value-of select="author"/></td>
                            <td><xsl:value-of select="title"/><td>
                            <td><xsl:value of select="category"/></td>
                            <td><xsl:value-of select="price"/></td>
                        </tr>
                    </xsl:for-each>
                </table>
            </body>
        </html>
    </xsl:template>
</xsl:stylesheet>
```

The Web editor would process the complete XSL stylesheet and the source data file to generate and render an updated HTML Web document in accord with data view 95.

Alternatively, the user may choose to keep the stylesheet separate from the Web document. In that case, the Web editor would only need to modify the Web document slightly to reference the stylesheet. Specifically, the Web editor would add an instruction to access and utilize the predefined XSL stylesheet. The Web document would initially be modified to include the following code. Again, the added code is shown in bold font.

```
<?xml-stylesheet
            type="text/xsl"
            href="stylesheet.xsl"?>
<html>
    <head>
        <title>A list of books</title>
    </head>
    <body>
        <h1>A list of books</h1>
    </body>
</html>
```

The corresponding XSL stylesheet file (e.g., stylesheet.xsl) would comprise the following code.

```
<?xml version="1.0"?>
<xsl:stylesheet
                xmlns:xsl=http://www.w3.org/1999/XSL/Transform
                version="1.0">
    <xsl:output method="html"/>
    <xsl:template match="/">
        <table>
            <xsl:for-each select="//book">
                <tr>
                    <td><xsl:value-of select="author"/></td>
                    <td><xsl:value-of select="title"/></td>
                    <td><xsl:value-of select="category"/></td>
                    <td><xsl:value-of select="price"/></td>
                </tr>
            </xsl:for-each>
        </table>
    </xsl:template>
</xsl:stylesheet>
```

The Web editor would process the modified Web document and source data file according to the XSL stylesheet to generate and render the updated HTML Web document. Note that in either case, a reference to the source data file is in a different property of a data view web part. Here we show only the XSL property of the data view web part. Further details regarding the processing performed by the Web editor are discussed below with regard to FIGS. 6 through 14.

Figure 4:
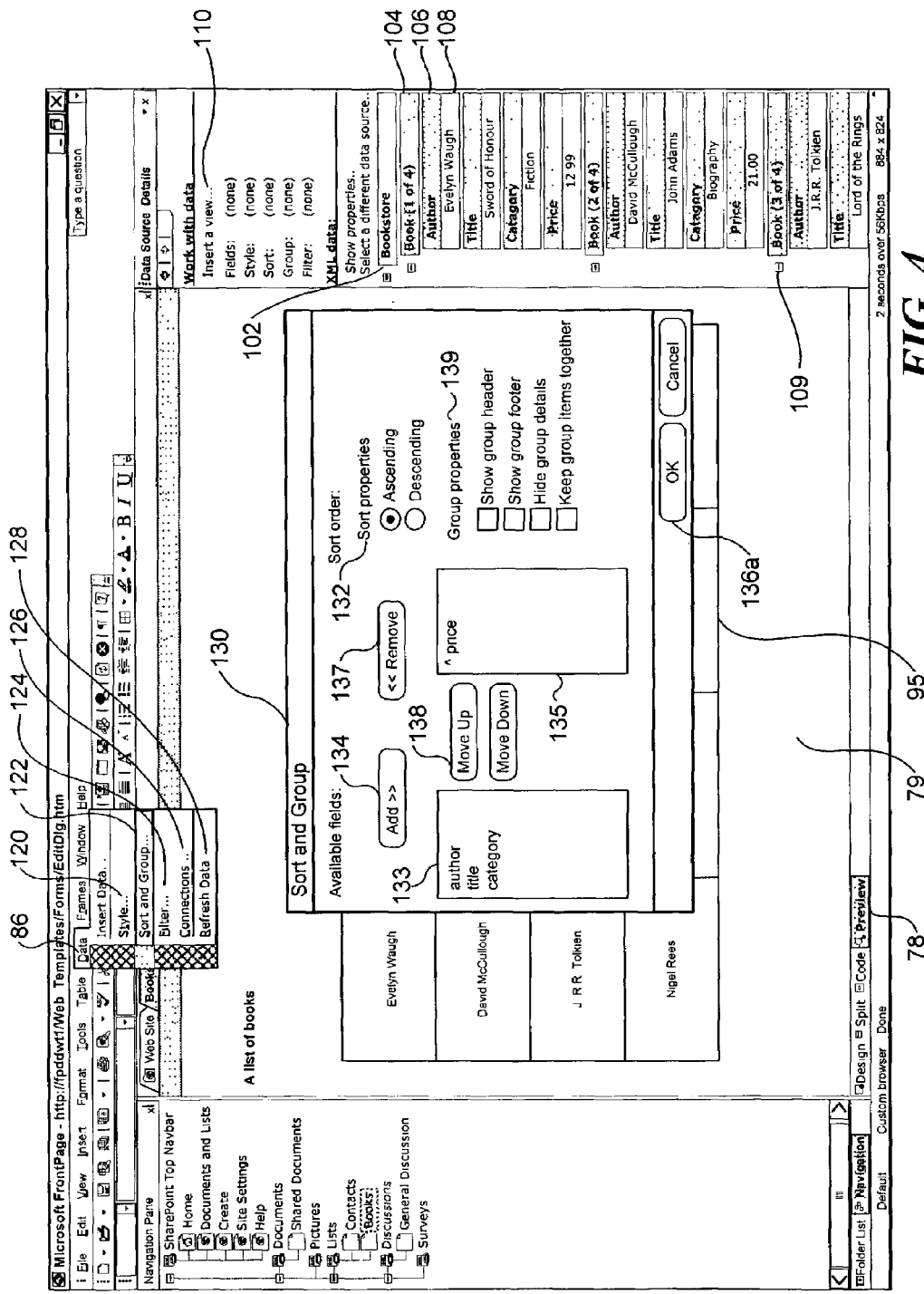
FIG. 4 is a screen print of the Web editor, showing a dialog box for defining, sorting, and grouping transformations to be performed on source data before rendering the source data in a Web document.

Once the Web editor generates and renders data view 95 in the updated HTML Web document, the user may make structural and formatting changes to data view 95 (and the rest of the Web document). For example, the user may wish to ensure that the data are always presented in ascending order by price. The user may select one book price or the column of book prices and invoke sort and group function 122. FIG. 4 is a screen print of Web editor 60 with a dialog box 130 for defining, sorting, and grouping transformations to be performed on the source data before rendering the source data in the Web document. The user may define a sorting order with a select, sort properties option 132. The user then selects a data field from a first list 133 of untransformed data fields. By pressing an add button 134, the user assigns a sorting transformation to the selected data field. The selected data field appears in a second list 135 of transformed data fields. When the user presses an OK button 136*a*, the Web editor automatically propagates the sorting transformation back into the XSL stylesheet. Specifically, the Web editor adds an <xsl:sort> tag at an appropriate location in the XSL stylesheet. The Web editor then retransforms the source data according to the updated XSL stylesheet and renders the resulting updated HTML. To remove the transformation, the user selects a data field from second list 135 and presses a remove button 137. The user may also define and control nested sorting by changing the order of the data fields as listed in second list 136. For example, the user could add another field to second list 136, select the other field in second list 136, and press a move up button 138. Doing so increases the sorting precedence of the selected field.

The user may further define group properties 139 for data within a selected field (i.e., a selected group). Group properties include showing a group header in data view 95. Similarly, the user may choose to show a group footer. Alternatively, the user may choose to hide data of a selected group so that the data of the selected group does not appear in data view 95. Further, the user may choose to keep group data together, preventing the grouped data from being broken up due to record set splitting, which is a setting of a style for a repeating region.

Figure 5:
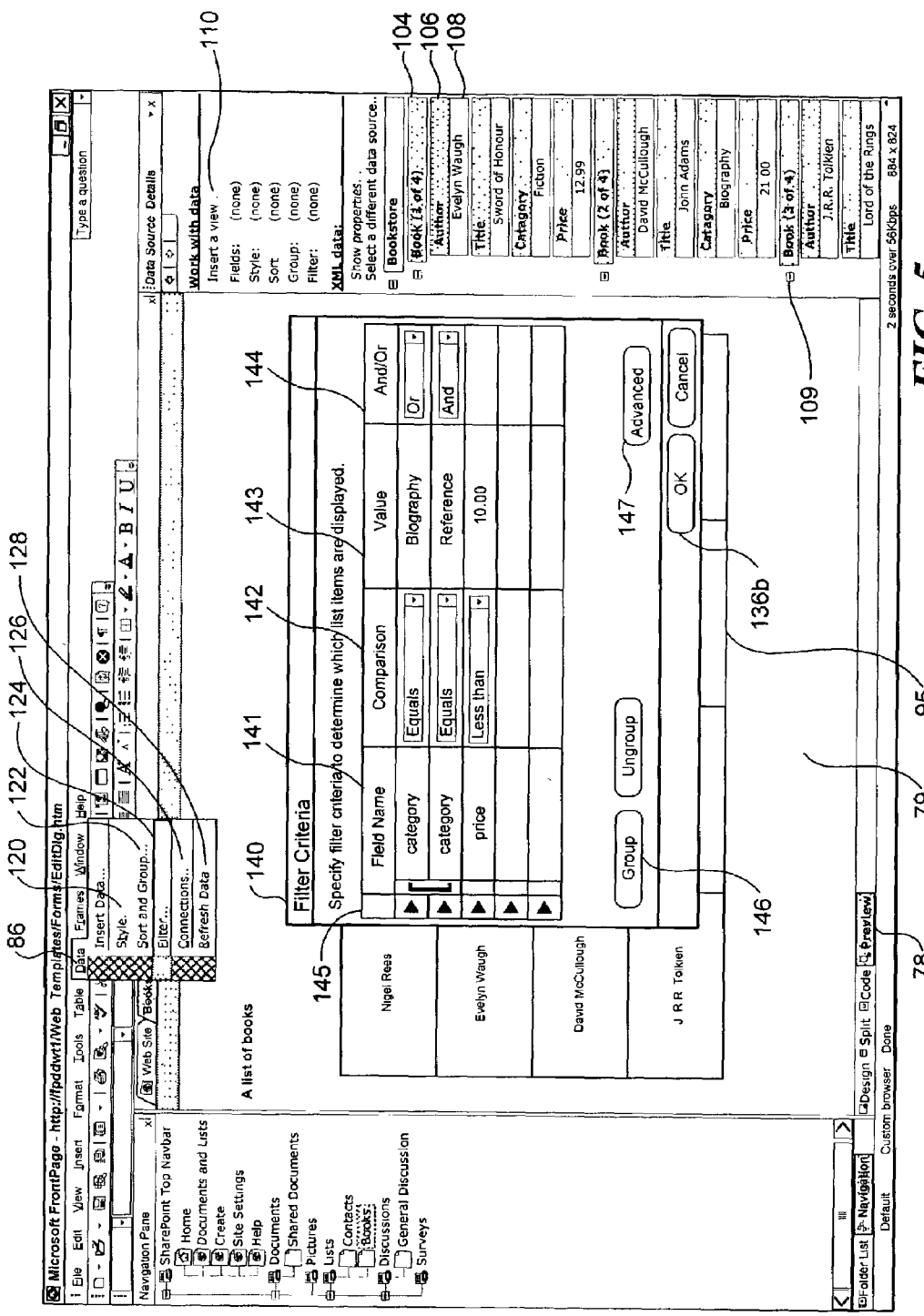
FIG. 5 is a screen print of the Web editor, showing a filtering dialog box for defining filtering transformations to be performed on the source data before rendering the source data in the Web document.

FIG. 5 is a screen print of Web editor 60 with a filtering dialog box 140 for defining filtering transformations to be performed on the source data before rendering the source data in the Web document. Via dialog box 140, the user may specify one or more filter criteria. In the simplest case, the user may specify a field name 141, a comparison 142, and a value 143 to establish a filter. Field name 141 identifies which data field of the data source will be evaluated. Comparison 142 identifies a relationship between field name 141 and value 143, wherein value 143 identifies a data value match of field name 141 for invoking the filter. Multiple criteria can be combined with a logical operator 144 to define a nested filter. Filter criteria can also be selected via a selector column 145 and grouped together by pressing a group button 146 to perform logically complex filtering. The filter criteria represent an XPath expression that is inserted into the XSL stylesheet and evaluated by the XSLT engine when the user presses an OK button 136*b*. For example, the filter criteria may specify a test condition of an <xsl:if> tag, an <xsl:choose> tag, or an <xsl:for-each> tag. The test condition for such tags is specified as an XPath expression. Information regarding evaluation precedence and other details regarding XPath expressions is available from the W3C website (http://www.w3c.org/TR/xpath). In addition to automatically inserting XPath expressions into the XSL stylesheet via the filter dialog box, the user may directly edit the XSL code for the filter query by selecting an advanced button 147 to access an editing window.

Implementation Logic

Figure 6:
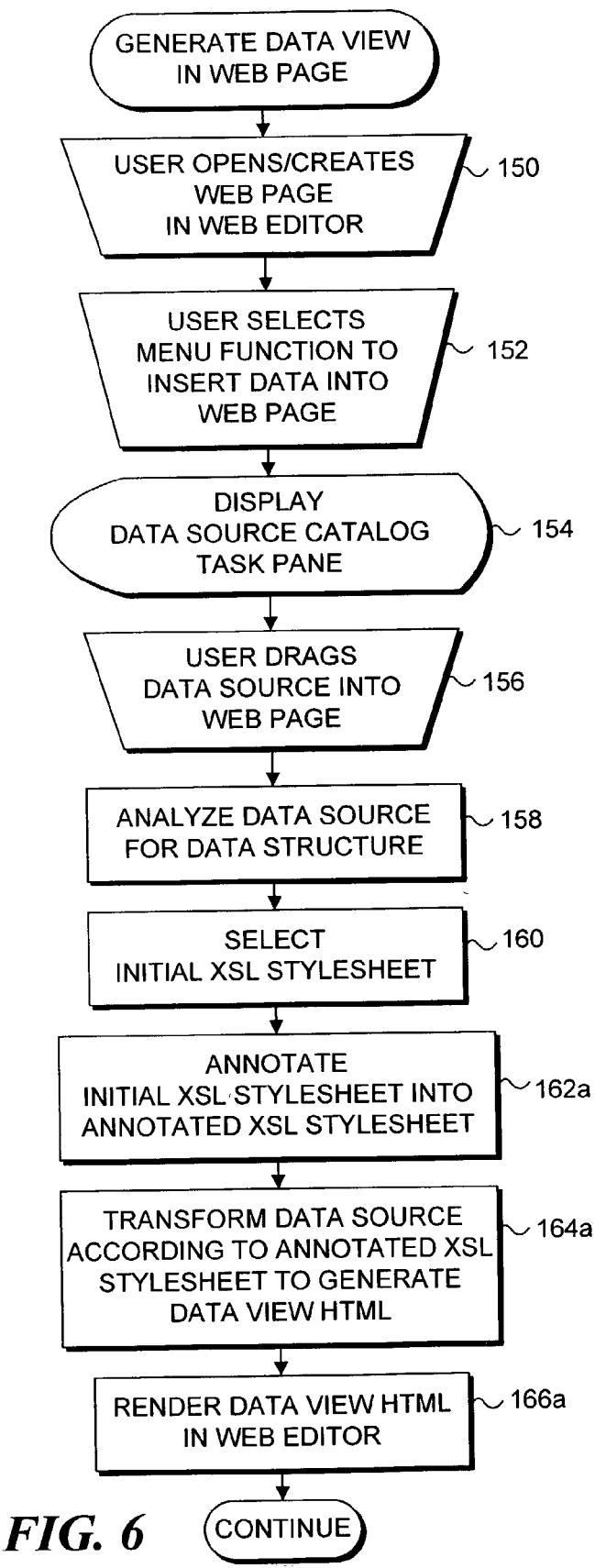
FIG. 6 is a flow diagram illustrating logic for generating a new data view in an HTML Web page.

Having introduced a preferred embodiment of the present invention in regard to its user interface, the following discussion provides more detailed logic for implementing the present invention. FIG. 6 is a flow diagram illustrating logic for generating a new data view in an HTML Web page. At a step 150, a user opens an existing Web page or creates a new Web page using the Web editor. At a step 152, the user selects the menu function to insert data into the Web page. The Web editor then displays a data source catalog task pane with data sources that are available to the user, at a step 154. At a step 156, the user selects a desired data source and drags and drops the data source into the Web page. Those skilled in the art will recognize that rather than dragging and dropping the data source, the user may insert the data source through an optional button in the task pane, by selecting a menu option, through a standard dialog box, or other conventional means.

At a step 158, the Web editor analyzes the data source to determine a type of data structure within the data source. At a step 160, the Web editor selects or generates a predefined initial XSL stylesheet based on the data structure of the data source determined above. The initial XSL stylesheet is selected or generated based on a collection of standardized XSL stylesheets that are provided with the Web editor to match the corresponding type of data structure within the data source. A simple XSL stylesheet was listed above. Further details regarding analysis of a data source and generation of an initial XSL stylesheet are provided in attached Appendix A.

At a step 162*a*, the Web editor annotates the initial XSL stylesheet to create an annotated XSL stylesheet. The annotated XSL stylesheet is a self describing version of the XSL stylesheet. The annotations provide means for mapping portions of the XSL stylesheet to the resulting HTML Web page, and back again. Further detail regarding annotating the XSL stylesheet is described below with regard to FIG. 9. At a step 164*a* of FIG. 6, the Web editor transforms the data source according to the annotated XSL stylesheet to generate HTML code that comprises a data view in the Web page (or comprises the entire Web page if the XSL stylesheet is embedded in the Web page). To perform the transformation, the Web editor utilizes a standard XSLT processor, such as Microsoft Corporation's MSXML XSLT engine. Further information regarding the MSXML XSLT engine can be found at http://msdn.microsoft.com/library/defaul-t.asp?URL=/nhp/default.asp?contentid=280004 38. At a step 166*a* the Web editor renders the data view HTML in the work area of the Web editor along with the rest of the Web page. Rendering the data view HTML is comparable to rendering any other HTML code, and details of this step are well known in the art. Once rendered, the user may modify the data view and the rest of the Web page with the Web editor.

Figure 7:
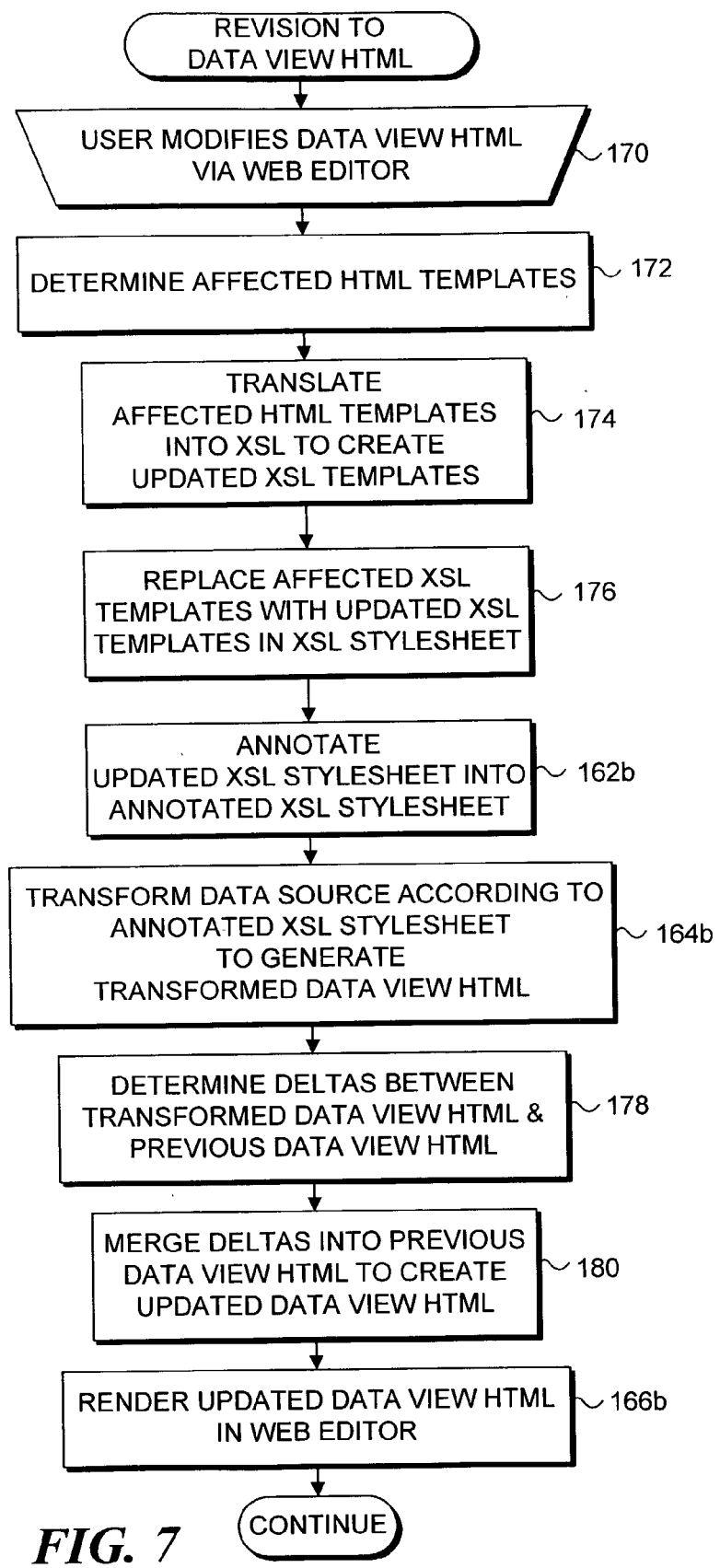
FIG. 7 is a flow diagram illustrating logic for updating the data view as a result of a user modification to the data view HTML.

FIG. 7 is a flow diagram illustrating logic for updating the data view as a result of a user modification to the data view HTML. At a step 170, the user modifies the data view HTML via the Web editor. Preferably, the user selects a portion of the data view and uses a toolbar or style function to modify the data view. For example, the user may select a field and change the color of all data in that field. At a step 172, the Web editor determines the elements of the data view HTML that were affected by the change. The affected elements correspond to one or more HTML template bodies, which relate back to XSL templates of the XSL stylesheet. Thus, the affected elements preferably comprise changed nodes within the HTML template bodies that originally resulted from transforming the corresponding XSL templates into HTML. Further detail regarding step 172 is described below with regard to FIG. 11. At a step 174 of FIG. 7, the Web editor translates the affected HTML template bodies back into XSL to create updated XSL templates. Details regarding step 174 are described below with regard to FIGS. 12A and 12B. At a step 176 of FIG. 7, the Web editor replaces correspondingly affected XSL templates of the original XSL stylesheet with the updated XSL templates. Further detail regarding step 176 is described below with regard to FIG. 13.

Figure 9:
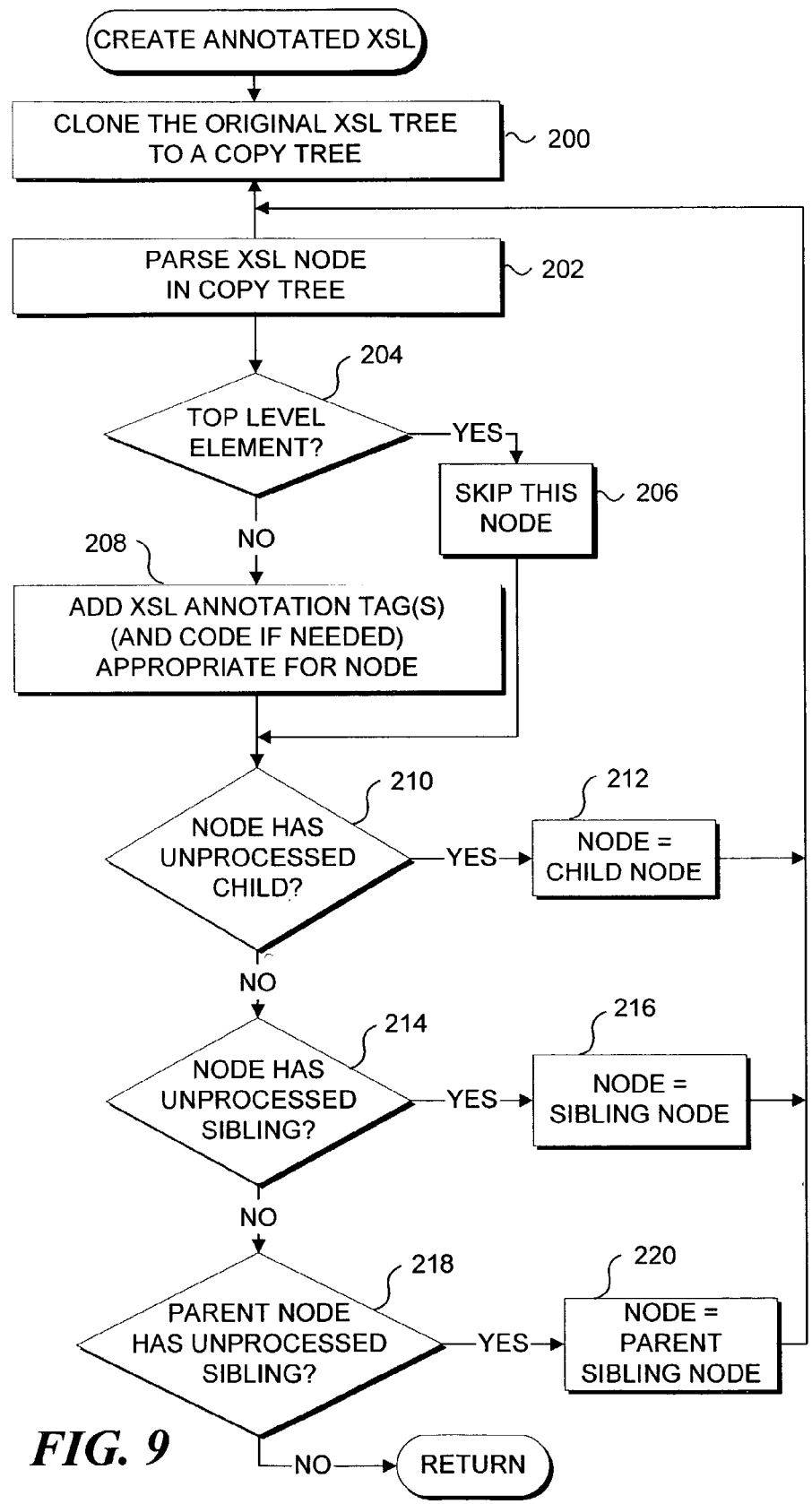
FIG. 9 is a flow diagram illustrating logic for creating annotated XSL code.

Once the XSL stylesheet is updated, the Web editor then begins the process of updating the data view HTML to reflect the modification made by the user. Although the data view HTML was already modified by the user, the effect of the user modification is not yet applied to the entire data view HTML. For instance, as described above, the user may have selected and modified the color of a single datum in a column of data presented in the data view. To apply the modification to the remainder of the data in the column, the updated XSL stylesheet must be transformed to update the data view HTML for the entire column. This process is similar to the process described above to generate and render the original data view HTML. At a step 162b, the Web editor annotates the updated XSL stylesheet, producing annotated XSL. As indicated above, the description regarding FIG. 9 provides further detail regarding this step. At a step 164b of FIG. 7, the Web editor transforms the data source according to the annotated XSL stylesheet to generate transformed data view HTML. As above, this transformation is performed via a standard XSLT engine.

At this point, it would be easy to simply render the transformed data view HTML to reflect the user modification to the data view. However, simply rendering the transformed data view HTML may make it appear to the user as if the entire Web page was modified rather than only that portion of the data view selected by the user. Continuing the example above, the user may have selected one datum of a column of data in the data view by highlighting that datum. If the transformed data view HTML was simply rendered in its entirety, the user selection would either be lost or need to be redetermined. Loss of the selection may be unsettling to the user and appear inconsistent with what the user has come to expect when working with other common editors, such as text editors. In most text editors a user's selection and/or cursor position are maintained when the user makes a modification. This characteristic enables the user to undo the modification, and/or continue editing at the same location in the text file. To maintain similar capabilities, the Web editor cannot re-render the data view HTML in its entirety. Instead, the Web editor modifies the previous data view HTML with the newly transformed data view HTML.

Thus, at a step 178, the Web editor determines differences between the transformed data view HTML and the previous data view HTML. These differences are referred to as deltas. This determination is accomplished with a straightforward process of comparing nodes of the transformed data view HTML with nodes of the previous data view HTML to identify insertions, deletions, and modifications. Specifically, a tree structure of the transformed data view HTML is compared with a tree structure of the previous data view HTML. The previous annotated XSL stylesheet provided a location of each node in the tree structure of the previous data view HTML. Similarly, the updated annotated XSL stylesheet provides a location of each node in the tree structure of the previous updated data view HTML. Thus a mapping exists between the two tree structures. The previous node locations are compared with the updated node locations to identify where nodes were inserted, deleted, and/or modified.

At a step 180, the Web editor merges the identified deltas for nodes into the previous data view HTML to create an updated data view HTML. The updated data view HTML is equivalent to the transformed data view HTML. However, by using deltas to update the previous data view HTML, the Web editor can maintain the user's selection and cursor position. The updated data view HTML is then rendered in the work area by the Web editor, at a step 166b.

Figure 8:
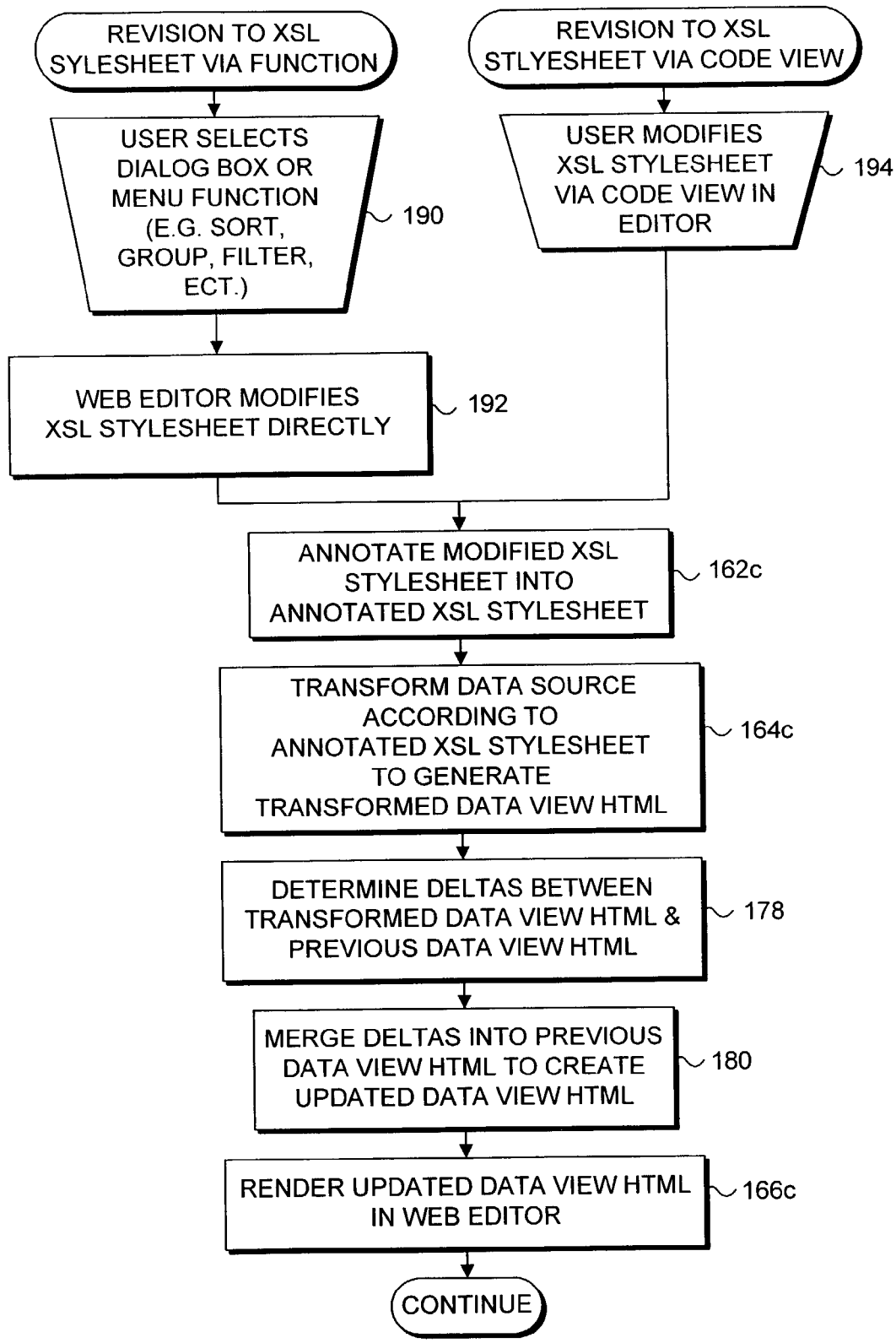
FIG. 8 is a flow diagram illustrating logic for revising a data view by revising the XSL stylesheet directly, rather than by first evaluating the data view HTML.

FIG. 8 is a flow diagram illustrating logic for revising a data view by revising the XSL stylesheet directly, rather than by first evaluating the data view HTML. In some cases, there is no need to analyze the HTML of the Web page. Instead, the user modification can be implemented by directly modifying the XSL stylesheet and regenerating the HTML for the data view or the entire Web page. For example, the user may utilize the sort menu function to rearrange the way the source data are presented in the data view. Since the user does not need to select an element in the existing HTML to invoke the sort function, the Web editor does not need to analyze the existing HTML. Instead, the sort can be implemented by directly modifying the XML stylesheet and retransforming the source data.

There are at least two alternatives for directly modifying the XSL stylesheet. At a step 190, the user may modify the data view via a dialog box associated with a menu function. As suggested, the user may invoke the dialog box associated with the sort and group function. In that case, the menu function of the Web editor modifies the XSL stylesheet directly, at a step 192. The menu function employs the user selections made in the dialog box to add to, delete from, or modify the XSL code of the XSL stylesheet. Alternatively, the user may directly modify code of the XSL stylesheet via the code view in the Web editor, at a step 194. For example, the user may paste or import custom XSL code into the XSL stylesheet.

Once the user makes a modification to the XSL stylesheet, the Web editor annotates the modified XSL stylesheet, at a step 162c, to create an annotated XSL stylesheet. As indicated above, details regarding this annotation process are described with regard to FIG. 9. At a step 164c of FIG. 8, the Web editor transforms the data source according to the annotated XSL stylesheet to generate transformed data view HTML. Also as indicated above, the transformation is performed by a standard XSLT engine. As with a user modification to the data view HTML, the Web editor does not simply render the transformed data view HTML. Instead, the Web editor determines deltas between the transformed data view HTML and the previous data view HTML, at a step 178. At a step 180, the Web editor merges the deltas into the previous data view HTML to create the updated data view HTML. At a step 166c, the Web editor renders the updated data view HTML.

FIG. 9 is a flow diagram illustrating logic for creating annotated XSL code. FIG. 9 corresponds to blocks 162a through 162c, as discussed with regard to the above figures. At a step 200, the Web editor clones an original XSL tree into a copy tree. The two trees are simply data structures of the XSL stylesheet. The copy tree will become the annotated XSL stylesheet. At a step 202, the Web editor parses an XSL node in the copy tree. The first XSL node to be processed will be the root node. The parsing determines what type of XSL node is in the XSL stylesheet, and determines a location of the XSL node relative to the root node of the copy tree. At a decision step 204, the Web editor determines whether the XSL node is a top level element. A top level element is an element that must be a direct child of an <xsl:stylesheet> element. If the current XSL node is a top level element, the Web editor skips this node at a step 206, because no annotation is required for a top level element.

However, if the current XSL node is not a top level element, the Web editor adds one or more XSL annotation tags to the stylesheet, at a step 208. Typically, the Web editor will add an opening annotation tag for the corresponding opening XSL tag of the current XSL node, and the Web editor will add a closing annotation tag for the corresponding closing XSL tag of the current XSL node. Preferably, each annotation tag reflects the tag name of the current XSL node. However, the annotation tag is distinguished by an annotation dash (-) in the tag, instead of the usual colon (:) that is used for a standard XSL tag. For example, when an <xsl:template> tag is encountered, the Web editor adds an <xsl-template> annotation tag. This annotation dash should not be confused with other dashes used in conventional XSL tags after the colon position. For example, the conventional <xsl:for-each> tag includes a conventional dash that is not added as an annotation. In addition to the tag name, each opening XSL annotation tag will include a node-walk attribute that identifies the location of the corresponding XSL node in the original XSL tree.

Each node has unique annotation requirements. For example, in addition to the annotation tag, the Web editor may also add unique XSL code appropriate for the XSL node. Also if appropriate, the Web editor may add a reference to an additional namespace. For example, an additional namespace is provided for a ddwrt:cf_ignore attribute to denote conditional XSL tags that should be ignored by a Conditional Formatting user interface. This is a convenience to the user, to prevent the user from directly edit hidden conditions that the Web editor puts in the XSL stylesheet for internal purposes. Another attribute, called a ddwrt:whitespace-preservation attribute, is used to mark <xsl:text> tags, which the Web editor inserts into the XSL stylesheet in order to preserve whitespace that the user inserted into the dataview, but would otherwise be ignored by the XSLT engine, according to standard rules for XSL processing. Denoting these whitespace preservation attributes is useful to delete appropriate <xsl:text> tags when they are no longer necessary, rather than deleting all <xsl:text> nodes, which the user may have intentionally inserted into the stylesheet. Unique annotation requirements for each XSL node are listed in attached Appendix B. Further detail regarding generating the appropriate annotation and code is described below, with regard to FIG. 10. In any case, the original XSL node remains part of the annotated stylesheet for transformation by the XSLT engine. Any added XSL code will also be transformed by the XSLT engine. However, the XSLT engine will ignore the annotation tags, like comments, and copy the annotation tags to the resulting HTML. Thus, the HTLM code produced by the XSLT engine will include annotation tags that reflect the original XSL node names and reflect the node locations in the tree structure of the original stylesheet. These annotation tags enable the Web editor to map subsequent changes in the HTML code back to the XSL stylesheet.

At a decision step 210, the Web editor determines whether the XSL node has an unprocessed child. An unprocessed child is simply a child node of the current XSL node, wherein the child node has not yet been evaluated for the need to annotate the child node. If the XSL node does have an unprocessed child, the Web editor sets the child node as the current node, at a step 212, and control returns to step 202 to process this current node. If the XSL node does not have an unprocessed child, the Web editor determines, at a decision step 214, whether the XSL node has an unprocessed sibling. If so, the Web editor sets the sibling node as the current node, at a step 216, and control returns to step 202. If the XSL node does not have an unprocessed sibling, the Web editor determines, at a decision step 218, whether the XSL node has a parent node that has an unprocessed sibling. If so, the Web editor sets the parent sibling node as the current node, at a step 220. In essence, the above logic "walks" the copy tree to generate an annotation tag for each appropriate XSL node. When all XSL nodes have been processed, control returns to a control module of the Web editor to continue with transformation of the data source according to the annotated XSL stylesheet.

Figure 10:
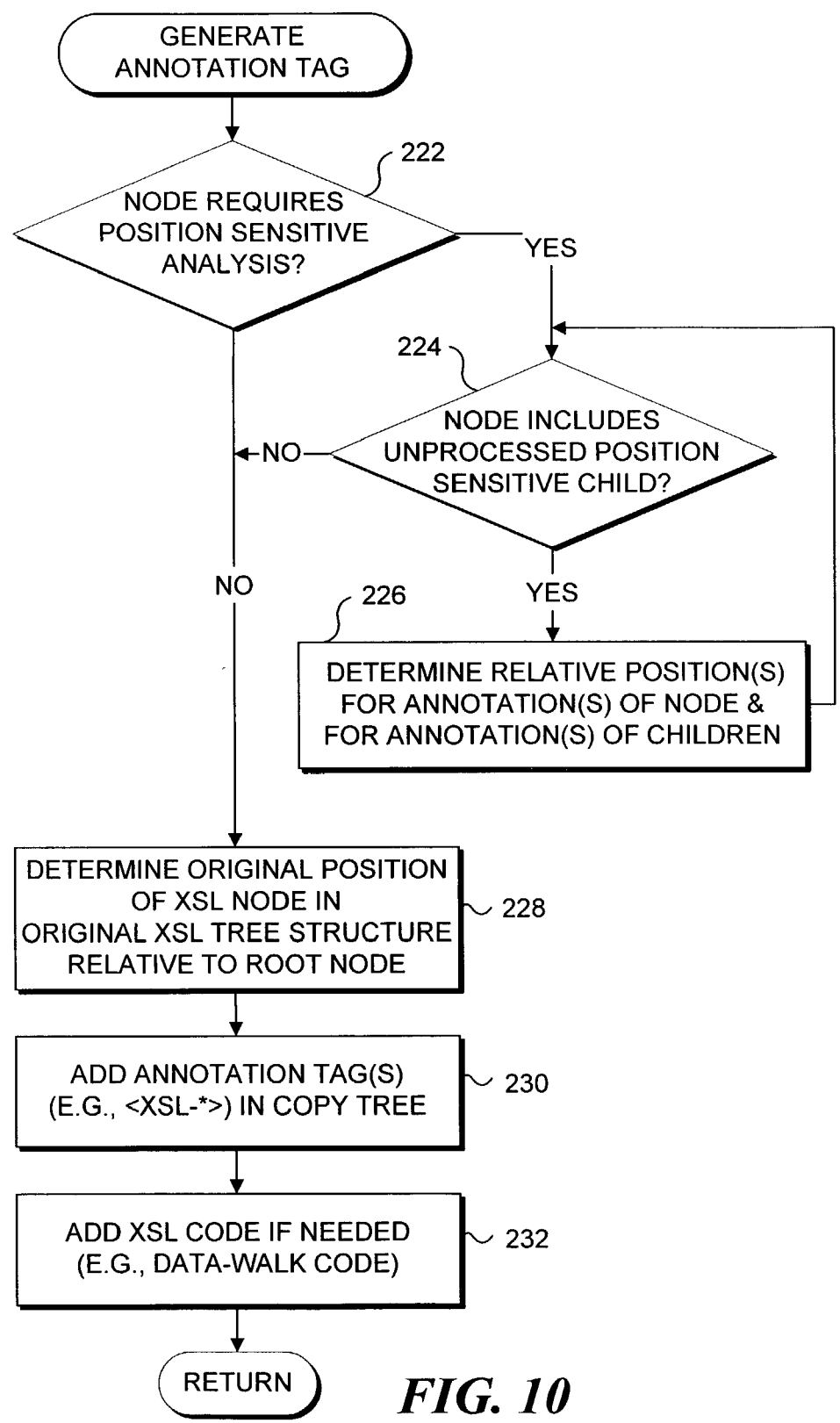
FIG. 10 is a flow diagram illustrating logic for generating one or more annotation tags for an XSL node.

FIG. 10 is a flow diagram illustrating logic for generating one or more annotation tags for an XSL node. FIG. 10 provides further detail of step 208 of FIG. 9. At a decision step 222, the Web editor determines whether the current XSL node requires a position sensitive analysis. Certain XSL nodes, such as conditional nodes, require an analysis of elements within the current XSL node to determine whether the node includes XSL tags that must be located at certain positions relative to the XSL node. If the Web editor determines that the current XSL node requires position sensitive analysis, the Web editor determines, at a decision step 224, whether the current XSL node includes an unprocessed position sensitive child tag. If so, the Web editor determines, at a step 226, a position for an annotation tag of the current XSL node, so that the annotation tag will not interfere with proper transformation of the resulting annotated XSL stylesheet by the XSLT engine. Similarly, the Web editor determines a position for an annotation tag of the position sensitive child tag. Because some position sensitive child tags may be nested within the current XSL node, the Web editor checks each child tag within the current XSL node, and determines appropriate positions for annotation tags of the current XSL node and the position sensitive child tags.

For example, if an <xsl:for-each> node includes an <xsl:sort> child tag, the <xsl:sort> child tag must be located immediately inside the <xsl:for-each> tag. In this case, an annotation tag cannot be placed immediately inside the <xsl:for-each> tag. Instead, an annotation tag for the <xsl:for-each> tag will be placed inside (i.e., after) the <xsl:sort> child tag. Specifically, an <xsl-for-each> annotation tag will be placed inside and after the original <xsl:sort> child tag. An <xsl-sort> annotation tag will be placed after the <xsl-for-each> annotation tag. Similarly, an <xsl:sort> child tag must be placed immediately inside an <xsl:apply-templates> tag. Other nodes that require position sensitive analysis include <xsl:template>, <xsl:if> and <xsl:choose> nodes.

Other child tags that must be placed in certain locations include <xsl:param> and <xsl:attribute> tags. Position requirements are based on W3C standards for XSL.

Once the position sensitive analysis is complete, or if no position sensitive analysis is required for the current XSL node, the Web editor determines, at a step 228, an original position of the current XSL node in the original XSL tree structure relative to the root node of the original XSL tree structure. This original position will remain consistent while the position of the current XSL node in the copy tree structure may change as annotation tags are added to the copy tree. The original position is provided in a "node-walk" attribute of the annotation tag. Thus, the value of the node-walk attribute of the annotation tag maps the annotation back to the correct position of the previous XSL stylesheet. The value of the node-walk attribute is represented as a semicolon-delimited list of numbers, which uniquely identifies a node in the original tree structure. The list of numbers corresponds to the branches of descendants from the root node to the current XSL node in the original tree structure. For example, a node-walk value of 1, 2, 1 corresponds to the first child of the second descendant of the first descendant of the root node of the original XSL tree structure. The Web editor determines a position of both the opening and closing tags of the current XSL node, so that the Web editor can add both an opening annotation tag and a closing annotation tag.

When the node-walk value is determined, the Web editor adds the appropriate annotation tags to the copy tree for the current XSL node, at a step 230. The node-walk attribute and value are included in the opening annotation tag. Some XSL nodes require an inner and an outer annotation tag. An inner annotation tag is an annotation tag that is placed within (i.e., after) the original XSL tag of the XSL node. Conversely, an outer annotation tag is an annotation tag that is placed outside (i.e., before) the original XSL tag of the XSL node.

Preferably, the Web editor also adds annotation tags for position sensitive children, if any were determined for the current XSL node as described above.

Depending on the node, the Web editor also adds additional XSL code to the copy tree, at a step 232. For example, an <xsl:for-each> node may access a data source in multiple iterations to obtain or otherwise process multiple data. Each datum must be identified in the resulting data view HTML, so that selection and modification of one datum can be identified and propagated back to the XSL stylesheet. Thus, the Web editor adds additional XSL code after an <xsl-for-each> annotation tag, so that the XSLT engine can insert a "data-walk" attribute into the <xsl-for-each> annotation tag in the resulting data view HTML. A value of the data walk attribute represents a sequential number of each datum from the data source. Similar code is added for an <xsl-template> tag to represent a root for the data source.

Provided below for inspection, is a further simplified version of the embedded XSL stylesheet discussed above, and a corresponding annotated XSL stylesheet. The annotation tags are in bold font, and added XSL code is in bold italics font.

```
<xsl:stylesheet version="1.0"
xmlns:xsl="http://www.w3.org/1999/XSL/Transform">
    <xsl:template match="/">
        <xsl:for-each select="/bookstore/book">
            <p><xsl:value-of select="title"/></p>
        </xsl:for-each>
    </xsl:template>
</xsl:stylesheet>
```

The annotated version of the above simplified stylesheet would be:

```
<xsl:stylesheet version="1.0"
xmlns:xsl="http://www.w3.org/1999/XSL/Transform">
    <xsl:template match="/">
        <xsl-template match="/" node-walk="0;0;">
            <xsl: attribute name="data-walk">
                <xsl: for-each select="ancestor-or-self::*">
                    <xsl: variable name="aurnode" select="."></xsl:variable>
                    <xsl: for-each select="ancestor::*[position()=1]">
                        <xsl: for-each select="child::node()">
                            <xsl: if test="generate-id(.) = generate-id( $aurnode)">
                                <xsl: value-of select="position()-1"></xsl: value-of>;
                            </xsl: if>
                        </xsl: for-each>
                    </xsl: for-each>
                </xsl: for-each>
            </xsl: attribute>
            <xsl-outside-for-each select="/bookstore/book" node-walk="0;0;0;1;">
                <xsl:for-each select="/bookstore/book">
                    <xsl-for-each select="/bookstore/book" node-walk-"0;0;0;1;">
                        <xsl: attribute name="data-walk">
                            xsl: for-each select="ancestor-or-self::*">
                                <xsl: variable name="aurnode" select="."></xsl:variable>
                                <xsl: for-each select="ancestor::*[position()=1]">
                                    <xsl: for-each select="child::node()">
```

-continued

```
generate-id($aurnode)">                      <xsl: if test="generate-id(.) =
1"></xsl: value-of>;                         <xsl: value-of select="position( )-
                                 </xsl: if>
                             </xsl: for-each>
                         </xsl: for-each>
                     </xsl: for-each>
                 </xsl: attribute>
                 <p>
                 <xsl-value-of select="title" node-
walk="0;0;0;1;0;0;0;">
                             <xsl:value-of
select="title"></xsl:value-of>
                         </xsl-value-of>
                     </p>
                 </xsl-for-each>
             </xsl-for-each>
         </xsl-outside-for-each>
     </xsl-template>
  </xsl:template>
</xsl:stylesheet>
```

As mentioned above, the source data is transformed according to the annotated XSL stylesheet. In the simplified example above, the XSL stylesheet is embedded within the HTML code defining the entire Web page. Thus, transforming the source data according to the annotated XSL stylesheet results in the complete HTML code for the entire Web page. If the XSL stylesheet were separate from the Web page, the source data would be transformed according to the separate XSL stylesheet, and the resulting data view HTML code would be inserted into the HTML code of the remainder of the Web page. In any case, a listing of the resulting HTML code for the simplified Web page defined above is provided below. In this example, a rudimentary data view is the only thing in the resulting simplified Web page. To reduce the size and complexity of the resulting HTML code, the following smaller set of source data is supplied to the XSLT engine.

```
<?xml version='1.0'?>
<bookstore>
    <book>
        <title>Seven Years in Trenton</title>
        <author>Joe Bob</author>
        <price>12</price>
    </book>
    <book>
        <title>History of Trenton</title>
        <author>Mary Bob</author>
        <price>55</price>
    </book>
</bookstore>
```

When the above source data are transformed, the XSLT engine produces the HTML code listed below. The resulting annotations are in bold font.

```
<xsl-template match="/" node-walk="0;0;" data-walk="">
    <xsl-outside-for-each select="/bookstore/book" node-
walk="0;0;0;1;">
        <xsl-for-each select="/bookstore/book" node-
```

-continued

```
walk="0;0;0;1;" data-walk="0;">
            <p><xsl-value-of select="title" node-
walk="0;0;0;1;0;0;0;">Seven Years in Trenton</xsl-value-
of></p>        </xsl-for-each>
            xsl-for-each select="/bookstore/book" node-
walk="0;0;0;1;" data-walk="1;">
            <p><xsl-value-of select="title" node-
walk="0;0;0;1;0;0;0;">History of Trenton</xsl-value-
of></p>
        </xsl-for-each>
    </xsl-outside-for-each>
</xsl-template>
```

The user can manipulate the above HTML code with the Web editor. User manipulations affect portions of the HTML code that correspond to XSL templates in the XSL stylesheet (e.g., the one XSL template in the above simplified XSL stylesheet). Correspondingly, these portions of the HTML code are sometimes referred to as HTML template bodies. The HTML template bodies are transformations of the XSL templates that are transformed using an XSLT engine. When the user manipulates the Web page, the manipulation may affect an HTML template body. The effect is propagated back to the appropriate template(s) in the XSL stylesheet.

Figure 11:
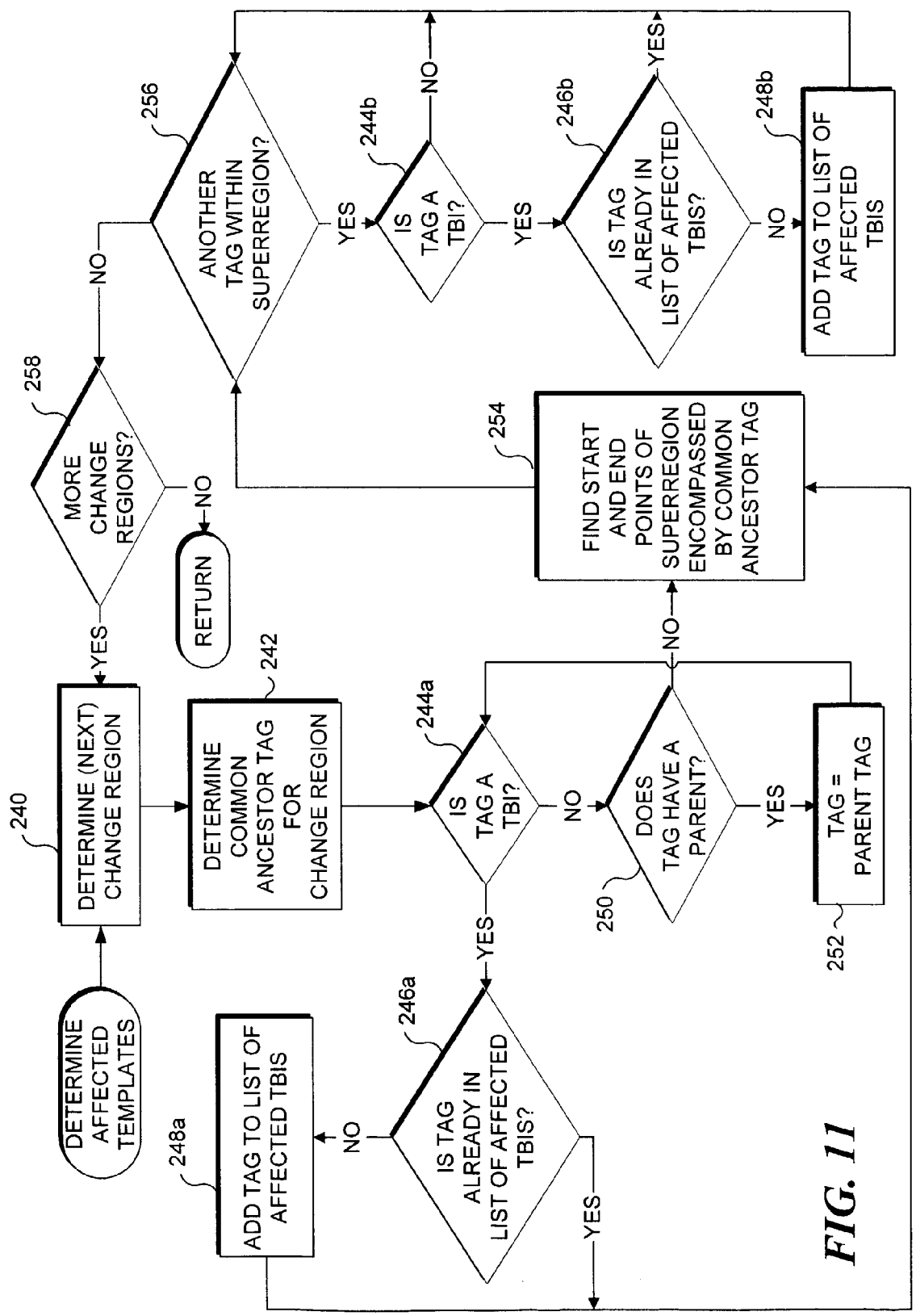
FIG. 11 is a flow diagram illustrating logic for determining affected HTML templates that result from a user modification to the data view.

FIG. 11 is a flow diagram illustrating logic for determining affected HTML templates that result from a user modification to the data view. FIG. 11 provides details for step 172 of FIG. 7. At a step 240 of FIG. 11, the Web editor determines a change region affected by the user modification. The change region corresponds to portions of the HTML document where insertions, deletions, or modifications have occurred. Specifically, whenever a user modifies the HTML document, the Web editor maintains a list of pointer pairs that point into a Unicode text array comprising the HTML document. The list of pointer pairs is referred to as a canonicalization sequence. Each pointer pair points to a start point and an end point in the text array where a change occurred. By tracking changes to the HTML document, the canonicalization sequence also reflects cursor locations, selection ranges, and event triggers. When the Web editor finishes processing an atomic command (i.e., an indivisible command that must be completed), the Web editor automatically runs a CanonicalizeTree function that performs internal housekeeping operations to ensure that the HTML document is in canonical form. However, before the CanonicalizeTree function clears the canonicalization sequence, the Web editor determines the start and end points of the change region, and performs the following steps.

At a step 242, the Web editor analyzes the HTML tree to determine a common ancestor tag that is the closest predecessor tag to the start point of the change region, and that encompasses both the start point and end point of the change region. The ancestor tag represents the start of a node that encompasses the change region, so the ancestor tag is affected by the user modification. Having found a common ancestor tag, the Web editor determines, at a decision step 244a, whether the common ancestor tag is a template body instantiation (TBI). Preferably, a TBI is simply a document annotation tag corresponding to the start of an XSL stylesheet template. In regard to the present embodiment, the TBI may be considered the start of an HTML body corresponding to the start of an XSL stylesheet template. Thus, the HTML body is sometimes referred to herein as an HTML template body. For example, a TBI may be an <xsl-template> annotation tag or an <xsl-for-each> annotation tag. If the common ancestor tag is a TBI, the Web editor determines, at a decision step 246a, whether this particular tag is already included in a list of TBIs affected by the user modification. If the tag is not already in the list of affected TBIs, the Web editor adds the tag to the list of affected template bodies, at a step 248a.

If the common ancestor tag is not a TBI, the Web editor determines, at a decision step 250, whether the common ancestor tag has a parent. If the tag has a parent, the Web editor sets the parent tag as the current tag to be analyzed, at a step 252. Control returns to decision step 244a to determine whether this current tag is a TBI. Effectively, the above logic walks up the nested structure of the HTML tree from the start point in the canonicalization sequence to determine the first TBI affected by the user change to the data view, thereby identifying a corresponding XSL template body that is affected by the user change. In other words, the Web editor finds the first document annotation tag that corresponds to an XSL template body tag in the XSL stylesheet that is affected by the user change to the data view HTML. The Web editor thus finds an affected <xsl-template> annotation tag or an affected <xsl-for-each> annotation tag that corresponds to an XSL tag in the XSL stylesheet that is affected by the user change. There may be sibling templates in the XSL stylesheet that are not affected by the user modification, so they are not included in the list. In general, the list of affected TBIs simply includes pointers to the document annotation tags in the HTML tree that represent the starting point of the affected HTML template bodies. Recall that the document annotation tags include a node-walk attribute that identifies the location of each corresponding XSL template body tag in the XSL stylesheet.

Once the Web editor has walked up the data view HTML tree to find the first parent tag affected by the user modification (e.g., the first TBI in the list of affected TBIs), the Web editor walks down each child branch of the common ancestor tag. To begin walking down, the Web editor first finds, at a step 254, a start and end point of a super region that is encompassed by the common ancestor tag. At a decision step 256, the Web editor determines whether another tag exists within the super region. If another tag exists, the Web editor determines, at a decision step 244b, whether this tag is a TBI. If this tag is not a TBI, control returns to decision step 256 to look for another tag. If, however, the tag is a TBI tag, the Web editor determines, at a decision step 246b, whether the tag is already included in the list of affected TBIs. If the current tag is already included in the list of affected TBIs, control returns to decision step 256 to look for another tag. However, if the tag is not already included in the list of affected TBIs, the tag is added to the list, at a step 248b, before control returns to decision step 256. The above process of walking the HTML tree is referred to as walking the spine of the tree.

Once all affected TBIs have been identified, the Web editor determines, at a decision step 258, whether another change region exists in the canonicalization sequence. Multiple user modifications may have been stored in the canonicalization sequence before the CanonicalizeTree function was called, which triggered the above process. If another change region exists, the Web editor processes this next change region as described above, starting at step 240. Once all change regions have been processed, control returns to a control module of the Web editor.

The above process can be illustrated in regard to the HTML code listed above. The user might select one datum of the data view by highlighting the book title Seven Years in Trenton. The user might then press the "bold" button in the toolbar. These actions cause the Web editor to perform (as is well known) the step of inserting a pair of <b> tags around the selected book title. Specifically, the internally stored HTML code is changed as shown below. The inserted <b> tags are shown in bold font.

```
<xsl-template match="/" node-walk="0;0;" data-walk="">
    <xsl-outside-for-each select="/bookstore/book" node-walk="0;0;0;1;">
        <xsl-for-each select="/bookstore/book" node-walk="0;0;0;1;" data-walk="0;">
            <p><b><xsl-value-of select="title" node-walk="0;0;0;1;0;0;0;">Seven Years in Trenton</xsl-value-of><b></p>          </xsl-for-each>
        <xsl-for-each select="/bookstore/book" node-walk="0;0;0;1;" data-walk="1;">
            <p><xsl-value-of select="title" node-walk="0;0;0;1;0;0;0;">History of Trenton</xsl-value-of></p>
        </xsl-for-each>
    </xsl-outside-for-each>
</xsl-template>
```

The canonicalization sequence will reflect the above change. When the CanonicalizeTree function is called, the Web editor will determine the start point in the canonicalization sequence where the first <b> tag was inserted. The Web editor will walk up the HTML tree to identify the <p> tag as the common ancestor. However, the <p> tag is not a TBI. Thus, the Web editor continues to walk up the HTML tree to the <xsl-for-each> document annotation tag that is a TBI. All tags within the HTML node defined by this TBI comprise an affected HTML template body.

After storing a pointer to the <xsl-for-each> document annotation tag in the list of affected TBIs, the Web editor determines the start and end point of a super region defined by the start and end of the common ancestor tag (i.e., the <p> tag). The Web editor then walks down the HTML tree within the super region to see if there are any other affected TBIs that are siblings of the first affected TBI. In this case, there is an <xsl-value-of> annotation tag, but it is not a TBI. Thus, the Web editor determines that there are no additional affected TBIs in the above example code. Therefore, in this case, there is only one affected TBI, which is first <xsl-for-each> annotation tag.

Figure 12A:
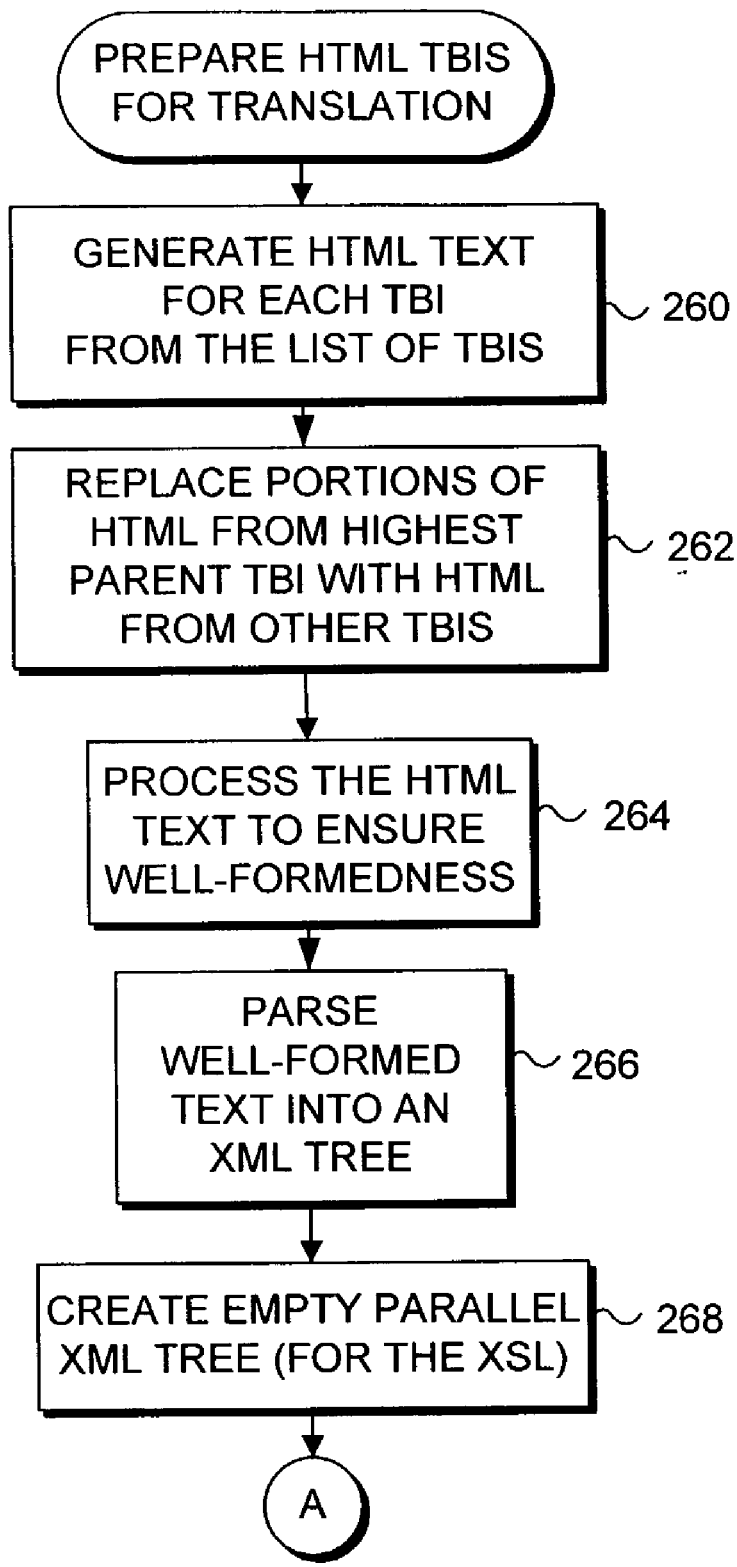
FIG. 12A is a flow diagram illustrating logic for preparing data view HTML template bodies for translation into XSL.

FIG. 12A is a flow diagram illustrating logic for preparing data view HTML template bodies for translation into XSL. At a step 260, the Web editor generates HTML text from the list of TBIs. Preferably, the internal array of HTML text is stored in segments within a data structure for use by the Web editor (thus, the need for the array of pointers). The data structure enables the Web editor to manipulate the HTML efficiently. The translation process could utilize the data structure directly; however, it is easier to parse and process a file of HTML text rather than perform multiple accesses and manipulations of the HTML data in the data structure. Thus, the objective of step 260 is to write the HTML stored in the data structure out to a text file in the same known manner that is currently used to generate a code view of the HTML text in the Web editor. In the example above, the Web editor would write out HTML text for the entire internally stored HTML encompassed by the <xsl-for-each> TBI.

Included in the HTML text generated from the first TBI (e.g., within the <xsl-for-each> TBI) may be HTML text at positions corresponding to lower level TBIs that may have been detected and listed. At a step 262, the HTML text at these positions is replaced with the HTML text generated for the lower level TBIs. This replacement is performed to ensure that the HTML text generated for each corresponding TBI, rather than relying on HTML text generated from within a TBI. Once the HTML text from each of the TBIs is prepared, the Web editor parses and modifies the HTML text, at a step 264, to ensure that the HTML is "well formed." At a step 266, the Web editor parses the well formed text into an XML tree. To parse the well formed text, the Web editor preferably invokes a publicly accessible "load" method of an MSXML component library. At a step 268, the Web editor creates an empty parallel tree to be populated with the XSL. Control then passes to the logic of FIG. 12B via a connector A.

Figure 12B:
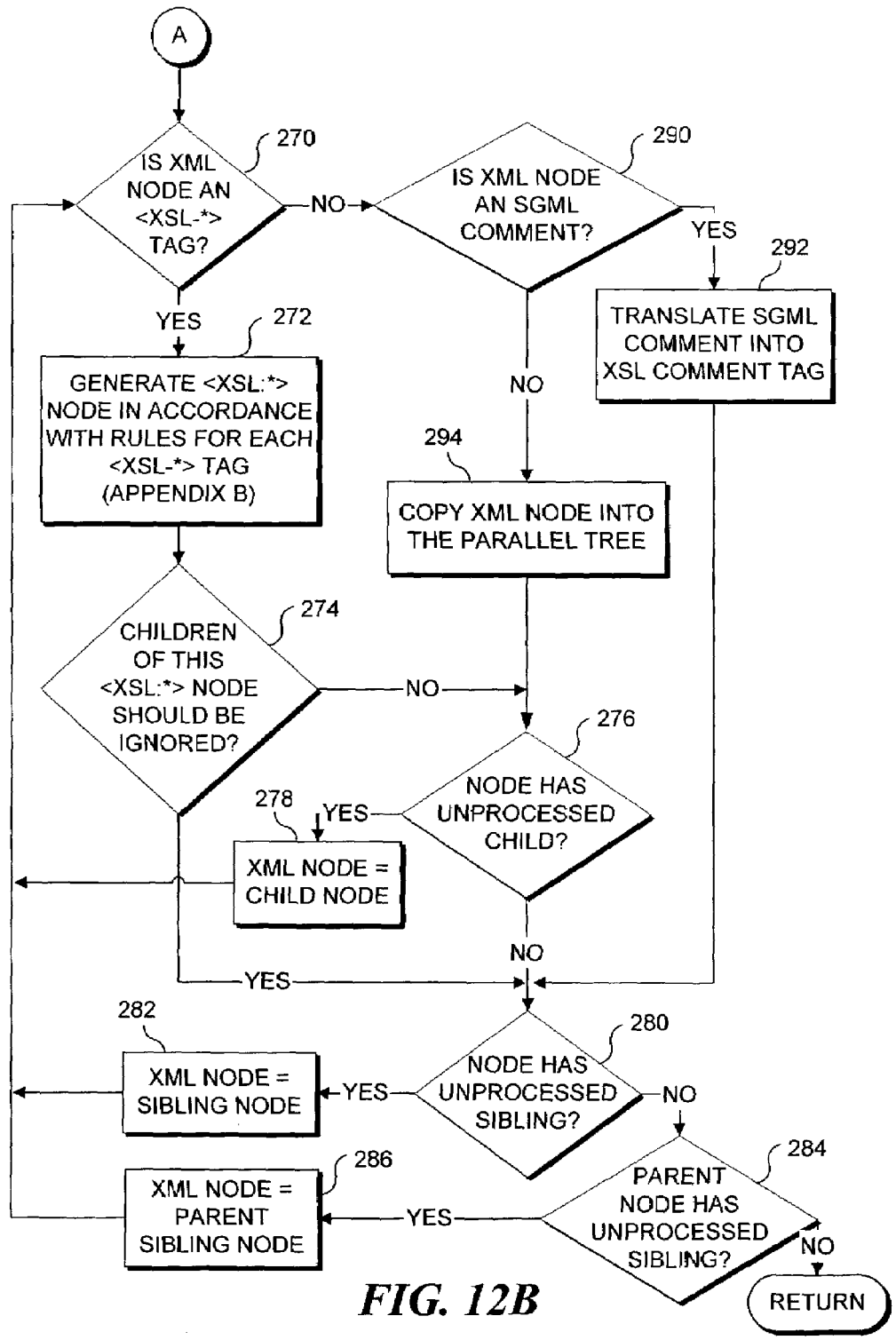
FIG. 12B is a flow diagram illustrating continued logic for translating annotated data view HTML into XSL.

FIG. 12B is a flow diagram illustrating continued logic for translating annotated data view HTML into XSL. Starting from the root node of the XML tree, the Web editor determines, at a decision step 270, whether a node is a document annotation tag, rather than any simple HTML elements carried over from the HTML template body. Recall that a document annotation tag includes the TBIs, but also includes other annotation tags identified by the dash in the prefix of the tag (e.g., "<xsl-value-of"). If the node is a document annotation tag, the Web editor generates a corresponding XSL tag, at a step 272, with the standard colon in the prefix (e.g., <"xsl:value-of"). Additional elements of the XSL node are also generated, carried over, or deleted as appropriate for the particular XSL tag. For example, the node-walk element, and data-walk element are eliminated from the document annotation tag and are not included in the generated XSL tag. However, the value of the node-walk element is stored as a pointer to the affected node in the XSL stylesheet. Just as a unique annotation is applied to each XSL tag when annotating the XSL stylesheet, a unique translation is applied to each document annotation tag in the XML tree. Details regarding the unique translation for each document annotation tag are provided in Appendix B.

Once an XSL node is generated, the Web editor determines, at a decision step 274, whether children of this XSL node should be ignored. This determination depends on the particular XSL node generated. The XSL nodes with children that should be ignored are identified in Appendix B. If the children of the current XSL node should not be ignored, the Web editor determines, at a decision step 276, whether the XSL node includes any unprocessed child. If so, the Web editor sets the child node as the current XML node, at a step 278.

Control returns to decision step 270 to process the child node. If the XSL node does not include any unprocessed children or the children should be ignored, the Web editor determines, at a decision step 280, whether the node has an unprocessed sibling. If the node has an unprocessed sibling, the Web editor sets the sibling node as the current XML node, at a step 282. Control returns to decision step 270 to process the sibling node. If the node does not have any unprocessed siblings, the Web editor determines, at a decision step 284, whether the current node has a parent node that has any unprocessed sibling. If the parent node has an unprocessed sibling, the Web editor sets the parent sibling node as the current XML node, at a step 286. Control then returns to a decision step 270 to process the parent sibling node. Once all of the nodes in the XML tree have been processed, control returns to the control module of the Web editor to continue with replacing the effected templates with the updated templates in the XSL stylesheet.

If the Web editor determines, at decision step 270, that an XML node is not an XSL annotation tag, the Web editor determines, at a decision step 290, whether the XML node is a Standard Generalized Markup Language (SGML) comment. An SGML comment is sometimes used for an automated feature called a Web-bot. Although a Web-bot is not relevant to the present invention, it should be noted that a Web-bot may be disabled if an SGML comment is not properly carried over to the parallel XML tree. Thus, if the Web editor determines that an XML node is an SGML comment, the Web editor translates the SGML comment into an XSL comment tag, at a step 292. If, however, the XML node is not an SGML comment, the Web editor simply copies the XML node into the parallel XML tree, at a step 294. Processing of children, siblings, and parent siblings of the current XML node then proceeds as described above. Note, however, that a comment does not have any children, so the Web editor need not attempt to process any children of the comment.

Figure 13:
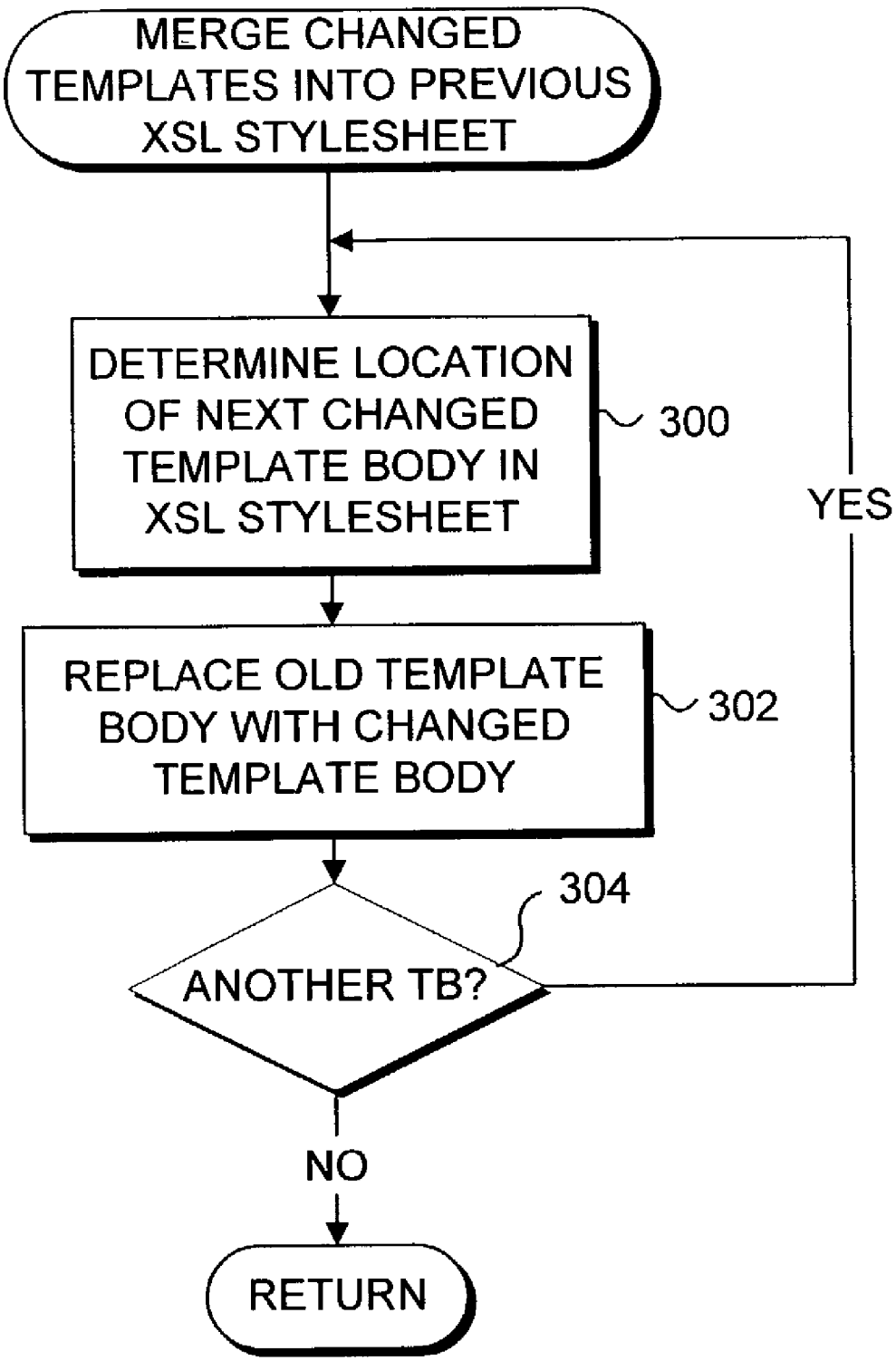
FIG. 13 is a flow diagram illustrating logic for merging changed templates into the previous XSL stylesheet.

FIG. 13 is a flow diagram illustrating logic for merging changed templates into the previous XSL stylesheet. FIG. 13 provides details for step 176 of FIG. 7. At a step 300 of FIG. 13, the Web editor determines a location in the XSL stylesheet of a next changed template body from the list of affected template bodies stored during the process illustrated in FIG. 11. Preferably, the Web editor refers to the stored pointer representing the value of the node-walk attribute. At a step 302, the Web editor replaces the old template body with the changed template body in the XSL stylesheet. At a decision step 304, the Web editor determines whether another changed template body must be processed from the list of template bodies. If another changed template body must be processed, control returns to step 300 to determine the location of the next changed template body. Once all changed template bodies have been processed, control returns to the control module of the Web editor to translate the updated XSL stylesheet into annotated XSL, transform the annotated XSL, and merge updated HTML into the previous HTML. Based on the above simplified example code, the updated XSL stylesheet would appear as follows.

The new bold tags are shown in bold font.

```
<xsl:stylesheet version="1.0"
  xmlns:xsl="http://www.w3.org/1999/XSL/Transform">
    <xsl:template match="/">
        <xsl for-each select="/bookstore/book">
            <p><b><xsl:value-of select="title"/></b></p>
        </xsl:for-each>
    </xsl:template>
</xsl:stylesheet>
```

Note that when the data are transformed according to the updated XSL stylesheet, the bold tag will be applied to all of the title elements of the data source, not just the single datum selected and modified by the user. Although the user selected only one datum, the modification is applied to entire data field of the selected datum. In practice, when the user selects the one datum, and presses the bold button, the resulting updated HTML that the user sees will be transformed from the updated XSL stylesheet. Thus, all data in the selected field are rendered to the display in bold.

Figure 14:
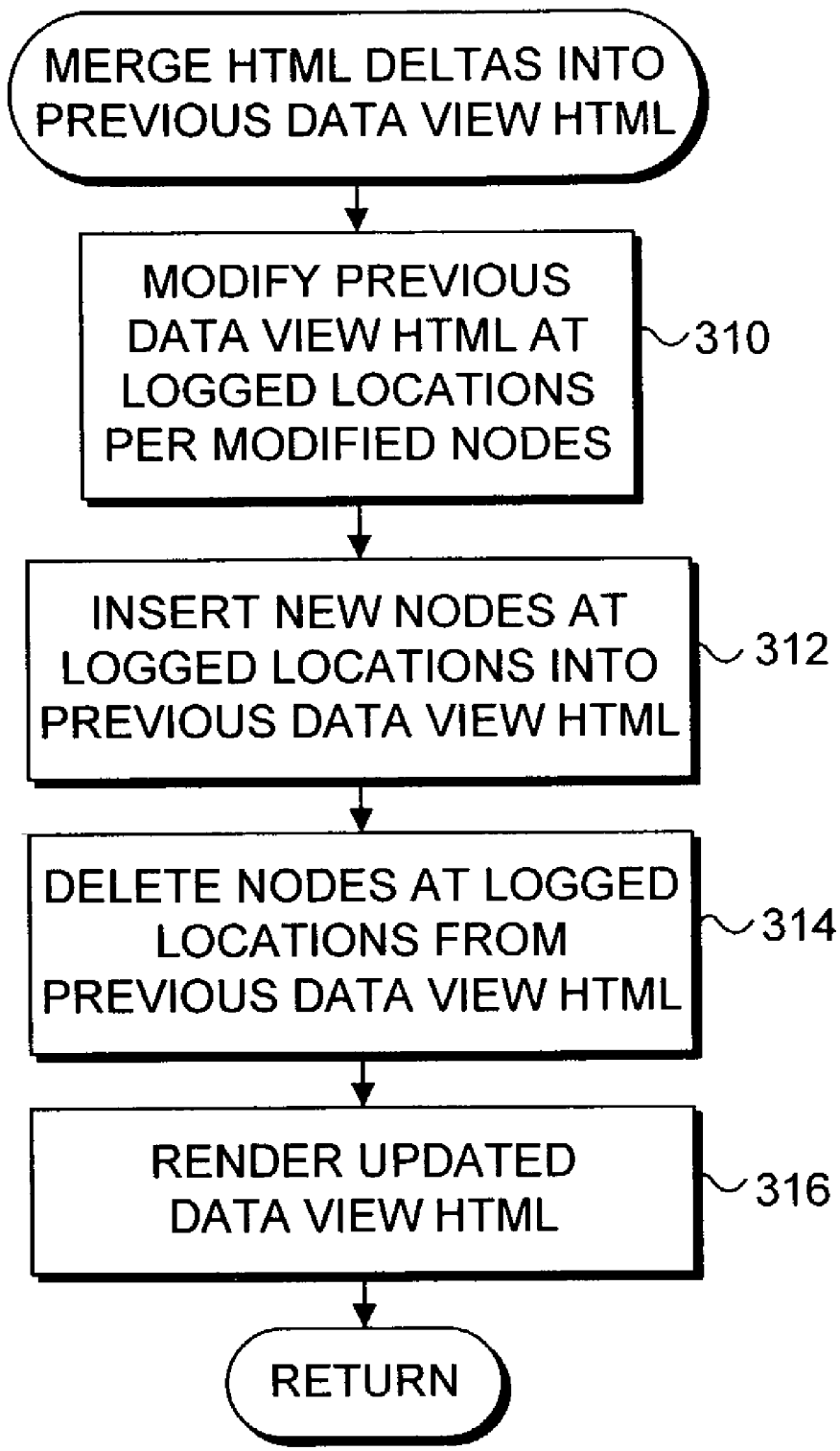
FIG. 14 is a flow diagram illustrating logic for merging HTML deltas into a previous data view HTML.

FIG. 14 is a flow diagram illustrating logic for merging HTML deltas into a previous data view HTML. FIG. 14 provides further detail regarding step 180 of FIG. 7. As discussed above with regard to FIG. 7, after the updated XSL stylesheet is transformed, the newly transformed HTML is compared with the previous HTML to determine deltas. The locations of the deltas are logged during this process. At a step 310 of FIG. 14, the Web editor replaces any modified nodes of the previous data view HTML at locations logged as modified. At a step 312, the Web editor inserts new nodes into the previous data view HTML from the transformed data view HTML at locations that were logged as new. Similarly, at a step 314, the Web editor deletes nodes from the previous data view HTML at locations that were logged as deleted. Of course, in the simplified code discussed above, a pair of bold tags would appear in the HTML around each <xsl-value-of> annotation tag, instead of around just the first <xsl-value-of> tag. Finally, the Web editor renders the updated data view HTML, at a step 316.

Although the present invention has been described in connection with the preferred form of practicing it, those of ordinary skill in the art will understand that many modifications can be made thereto within the scope of the claims that follow. For example, a similar annotation system may be implemented for other formats of source data, stylesheets, and output documents. Further, the invention is not limited to transforming tabular-style data, but may be implemented to transform any data, including text, markup, and other documents according to an annotated stylesheet that provides a mapping between the stylesheet and the output document. Accordingly, it is not intended that the scope of the invention in any way be limited by the above description, but instead be determined entirely by reference to the claims that follow.

APPENDIX A

The following algorithm is used when inserting a view of a given XML data source. Phase One is field selection, with output being a list of XPath expressions to include in the view. Phase Two is view generation, which creates an XSL stylesheet in one of several formats (examples are Table, Bullet List, and Two-Column Form).

A view can be inserted either by manually selecting a set of nodes in the XML Data Tree, or by just selecting a data source (such as an XML file) and letting the program create a "default view", which finds and selects some set of nodes automatically. The process in Phase One is only required when a default view is inserted.

Phase One – field selection

This phase of the process can work with any XML data source. The XML does not have to contain or reference any schema information.

First the input XML is examined for any repeating nodes, which are elements with one or more siblings with the same name from the same namespace. These "repeats" are assumed to be the most likely elements on which to base a view. They correspond to rows of data in a tabular format. The namespace of each candidate repeat is then examined for rejection or selection. For example, schema information from the XML-DATA format is rejected, but rows of data from XML-DATA are selected.

Next the remaining repeat nodes are examined for the "fields" and "containers" inside them. A field is defined as a single data item occurring inside a repeat, which is either an attribute of the repeat element, or a singular child of the repeat containing text values (no sub-elements). It corresponds to a column in a table of data. A container is an element with no text value that only contains other elements. In XML, containers are often used to provide a better abstraction of a complex structure.

The algorithm proceeds to check for suitable field values within the selected repeat, until it has collected a maximum number, such as five (call this MaxFields). If the selected repeat node has less than MaxFields fields, its sub-containers will be searched for more fields. Some of those containers may themselves be repeats.

All instances of a repeat must be examined, since the shape of the repeat may be "irregular" (that is, the same fields may not appear in every instance of the repeating element). This is a feature of XML that makes it different from a relational database or a spreadsheet, where all columns must be present in all rows.

At this point, we have collected the XPaths for some number of fields between 0 and MaxFields. Call this number NumFields.

Phase Two – XSL generation

If NumFields is 0, a view is made on the single top-most element in the document. Otherwise, a tree structure is created based on all the selected XPaths. Each node in this tree corresponds to a segment of the XPath for a selected field. The leaf nodes are the field values.

Next, all of the repeat nodes in the tree are marked with a flag. The purpose of this flag is to establish a boundary between views, so that a field "belongs" to its nearest repeating parent, and sub-views are created when necessary to properly display repeats within repeats. For example, the V.

A recursive function CreateView is called on the top-level node of this tree. The first step is to create a View Description. A View Description is some XML that describes the RowPath (the XPath of the base repeat element), a set of Fields relative to this RowPath, and the name, XPath value, title, and data type for each View Field. The description is assembled by collecting all the leaf nodes under the top node, but stopping at repeats as described in the preceding paragraph. If a repeat node is encountered, a sub-view is created by calling CreateView again, but with the current node as the top.

The Title of each Field in the description is the undecorated label of the last segment of its XPath. This can be changed later once the view is created. The Type of each field is determined by examining either (1) the data present in a subset of the fields in the repeat, or (2) any schema information associated with the XML.

The Type name is shorthand for a particular Field Value Template (FVT) that is used to generate HTML to display that type of field data. For example, if the type is detected as "image", the HTML generated for the field by the FVT would display an HTML "IMG" tag with the SRC attribute containing the field's value. The type can also be changed by the user after view generation.

If a repeat boundary is crossed, the field type is set to "view", and XSL is generated to call the sub-view template with each row in the containing view. The XSL for sub-views is made by calling CreateView with the containing view as its context, and appending the result to the output stylesheet.

The output XSL stylesheet is created as follows. First a view-generating XSL stylesheet built into the Web Editor is loaded, and the View Description is inserted into it. Then this stylesheet is used to transform an input XML document containing a number of View Styles, with the output being the actual XSL that is used in the Web Editor.

There are more than a dozen View Styles defined by the Web Editor. Examples include Table, Bullet List, and Form. The set of View Styles is extensible. Internally we refer to these styles as Data View Templates (DVTs).

Each View Style has a number of elements that describe it, and other well-known structural elements that generate HTML via named XSL templates. These templates correspond to particular features of a view that can be manipulated easily by the user interface once the view is created. The set of structural elements includes: Root, Empty, Toolbar, Header, Body, Footer, GroupHeader, GroupFooter, and Navigation. For example, the Empty element is shown when there are no rows to display, and the Navigation template is shown when the user wants to display the data in small sets with "next" and "previous" links, and there is too much data to display all at once.

The structural elements mentioned above can contain sub-elements that also generate XSL. For example, the tag <dvt_ForEachField> causes the contained tags to be repeated once for each <Field> tag in the View Description. In this context, the <dvt_Field> tag can output the value or title of the current <Field> in the iteration. This allows the style author to achieve effects like creating a header row in an HTML table where each column displays the title for the corresponding field.

An important point is that the default View Styles built into the Web Editor are independent of any particular XML schema in the data source. They can be used to generate XSL that transforms any XML input into HTML. However, nothing precludes the ability to have DVTs that are designed to work only with (or best with) particular XML schemas, known by their namespace URIs.

When the Web Editor inserts a view of an XML data source, it picks a default View Style for each view and sub-view based on the instance count of each repeat node and the number of fields it contains. For example, if there are twenty instances of the View's RowPath and it contains five fields, the Web Editor uses the Table style. If the selected RowPath has only one instance (is not a repeat), the Web Editor uses a Form style containing two columns (one for the name of each field, and one for its value). If a View contains only a single field but multiple instances, it is displayed as a Bullet List.

With the above rules, plus all the variations allowed for displaying different field types, it is fairly easy to create complex and richly-formatted views, even just by dragging-and-dropping an XML view into the Web Editor.

Since the default view style isn't always what the user wanted, the Web Editor provides controls to change the style of each view or sub-view after insertion. This is accomplished by extracting enough information from the XSL to synthesize the View Description used to create each View. Then the author can change the set of fields, the order they appear, the title or type of each field, or the style of the view with a dialog box, and the above process for XSL generation is run through again. The resulting XSL templates are used to replace the originals, and the view is refreshed to display the same data in a new style.

APPENDIX B

This appendix describes how each XSL tag is processed during the stage of annotating an XSL stylesheet and during the corresponding stage of translating an annotation back into standard XSL. The appendix is organized in alphabetical order by the names of the XSL tags.

<xsl:apply-imports>

Annotation Stage

Generate an annotation tag around the outside of this tag (i.e., before this tag).

Translation Stage

Convert the annotation tag to the xsl tag, and ignore all contents

<xsl:apply-templates>

Annotation Stage

Generate an annotation tag around the outside of this tag. For each child tag, generate a corresponding annotation tag outside of this tag, inside the annotation tag.

Translation Stage

Convert annotation tag to the xsl tag, and ignore all contents except immediate child xsl:sort and xsl:with-param annotation tags, which are converted back to xsl tags.

<xsl:attribute>

Annotation Stage

Generate an annotation tag immediately after this tag and all subsequent <xsl:attribute> tags. Take all of the contents of this tag, and encode them inside an "content" attribute in the annotation tag. Otherwise, text would actually show up inside the document. Note that in the case of conditionals, <xsl:attributes> will be handled in a different way as per the discussion of position sensitive analysis and as is discussed in the conditional formatting tags.

Translation Stage

Take the content of the annotation tag and use it to create a new <xsl:attribute> tag <xsl:attribute-set>

Annotation Stage

Not a template body tag, therefore, clone it and all children as is

Translation Stage

Should never appear in roundtrip xsl, which consists only of content generated from template bodies <xsl:call-template>

Annotation Stage

Generate annotation tag around the xsl tag. For each child tag, generate a corresponding annotation tag which is a child of this one's annotation tag (a la xsl:apply-templates)

Translation Stage

Convert annotation tag to the xsl tag, and ignore all contents except immediate child xsl:with-param annotation tags, which are converted back to xsl tags.

<xsl:choose>

Annotation Stage

First do position-sensitive <xsl:attribute> analysis iff parent tag is not an xsl tag, and all previous siblings are xsl tags. The result is possibly a new tree which is immediately preceding this tag. Then generate an annotation tag outside of this tag.

Translation Stage

The problem is that only one of my children (xsl:when or xsl:otherwise) was actually evaluated. We use the dataview version of that child, while copying the original xsl version of all of the others. Convert annotation tag to xsl. For each of the children in the original xsl tree, clone the original and insert underneath my tag, except if the original corresponds to my child which actually evaluated. In that case, recurse on child.

<xsl:comment>

Annotation Stage

Generate annotation tag around the outside of this one

Translation Stage

Generate real tag from the annotation tag.

<xsl:copy>

Annotation Stage

Generate outer annotation tag around the outside of this one.

Translation Stage

Generate xsl tag from outer annotation tag. Then ignore child tag (there should be only one). Take contents of child (should be an inner xsl:copy annotation tag) and recurse on it.

<xsl:copy-of>

Annotation Stage

Generate outer annotation

Translation Stage

Generate XSL tag from outer annotation tag. Ignore contents.

<xsl:decimal-format>

Top level element

<xsl:element>

Annotation Stage

Generate outer annotation

Translation Stage

Generate XSL tag from outer annotation tag. Ignore inner tag. Recurse on inner tag's contents.

<xsl:fallback>

Annotation Stage

Generate outer annotation

Translation Stage

Generate XSL tag from outer annotation tag

<xsl:for-each>

Annotation Stage

First do position-sensitive <xsl:attribute> analysis iff parent tag is not an xsl tag, and all previous siblings are xsl tags. The result is possibly a new tree which is immediately preceding this tag. Then generate an annotation tag outside of this tag. Then clone xsl:sort tags parented to outer annotation tag. Then generate annotation tag inside of this tag.

Translation Stage

If there is no inner for-each then reuse the one from the original xsl doc.

<xsl:if>

Annotation Stage

First do position-sensitive <xsl:attribute> analysis iff parent tag is not an xsl tag, and all previous siblings are xsl tags. The result is possibly a new tree which is immediately preceding this tag. Then generate an annotation tag outside of this tag. Then generate annotation tag inside of this tag.

Translation Stage

If there is no inner if then reuse the one from the original xsl doc.

<xsl:import>

Top level element

<xsl:include>

Top level element

<xsl:key>

Top level element

<xsl:message>

Annotation Stage

Generate outer annotation tag

Translation Stage

Generate xsl tag from outer annotation tag

<xsl:namespace-alias>

Top level element

<xsl:number>

Annotation Stage

Generate outer annotation tag

Translation Stage

Generate xsl tag from outer annotation tag. Ignore child elements.

<xsl:otherwise>

Annotation Stage

Generate inner annotation tag

Translation Stage handled by the <xsl:choose>

Top level element

<xsl:param>

Annotation Stage

Replace this tag with annotation tag. Take all of the contents of this tag, and encode them inside an "content" attribute in the annotation tag. Otherwise, text would actually show up inside the document. Note that this tag will have otherwise been copied already in the handling of <xsl:template>

Translation Stage

Take the content of the annotation tag and use it to create a new <xsl:param> tag <xsl:preserve-space>

Top level element

<xsl:processing-instruction>

Annotation Stage

Generate outside annotation tag

Translation Stage

Use annotation tag to generate xsl tag

<xsl:sort>

Annotation Stage

Generate annotation node and replace current node.

Translation Stage

Replace annotation node with XSL node.

<xsl:strip-space>

Top level element

<xsl:stylesheet>

Top top level element

<xsl:template>

Annotation Stage

Generate inner annotation. Clone <xsl:param> tags outside the annotation tag. Recurse Translation Stage Only process top level template. After that we just ignore them.

<xsl:text>

Annotation Stage

Generate outer annotation tag

Translation Stage

Generate XSL tag from annotation tag.

<xsl:transform>

Top top level element

<xsl:value-of>

Annotation Stage

Generate outer annotation tag

Translation Stage

Generate XSL tag from annotation tag. Ignore contents.

<xsl:variable>

Annotation Stage

Generate sibling annotation tag, and store contents encoded in sibling attribute.

Translation Stage

Use contents attribute to regenerate variable

<xsl:when>

See <xsl:otherwise>

<xsl:with-param>

Annotation Stage

Parent call-template or apply-templates tag should have taken care of cloning outside the wrapper as necessary. Replace current node with annotation node. Store contents as attribute in annotation class, to avoid having text nodes show up in the document Translation Stage Use contents attribute to regenerate variable.

The invention in which an exclusive right is claimed is defined by the following:

1. A computing device implemented method for displaying data in a document according to a transformation stylesheet, and enabling a modification to the document to automatically update the transformation stylesheet, comprising the steps of:
   (a) associating the data with the document;
   (b) determining a structure of the data;
   (c) applying a transformation stylesheet that corresponds to the determined structure, wherein the transformation stylesheet defines at least one of a structure and a format for displaying the data;
   (d) annotating the transformation stylesheet to create an annotated transformation stylesheet;
   (e) transforming the data according to the annotated transformation stylesheet to generate a data view for the document that is encoded to be compatible with a coding of the document and to include one or more annotations that respectively map one or more locations within the document to corresponding one or more locations in the transformation stylesheet;
   (f) rendering the data view for the document to display the data;
   (g) enabling a user to modify the document; and
   (h) automatically updating the transformation stylesheet in correspondence with a modification made by the user to the document, so that the transformation stylesheet is automatically changed in a manner corresponding to the modification made by the user to the document.

2. The method of claim 1, wherein the transformation stylesheet is in accord with an extensible Stylesheet Language (XSL) specification.

3. The method of claim 1, wherein the step of associating the data with the document comprises the steps of:
   (a) enabling the user to select a data source that includes the data; and
   (b) inserting a reference to the data source into the document.

4. The method of claim 3, wherein the step of inserting comprises the step of providing a tag having a value that defines the location of the node.

5. The method of claim 1, wherein the step of annotating the transformation stylesheet comprises the steps of:
   (a) determining whether a node in the transformation stylesheet is a top level element, wherein a top level element is a direct child of a root element of the transformation stylesheet;
   (b) if the node is not a top level element, determining a location of the node in the transformation stylesheet, wherein the location of the node is relative to the, root element in a tree structure representing all nodes comprising the transformation stylesheet;
   (c) if the node is not a top level element, inserting into the transformation stylesheet an annotation indicating the location of the node; and
   (d) repeating steps (a) through (c) for each node in the transformation stylesheet.

6. The method of claim 1, wherein the step of transforming the data comprises the step of executing an XSL Transformations (XSLT) engine that automatically transforms data according to the transformation stylesheet into the encoding that is compatible with the coding of the document.

7. The method of claim 6, wherein the step of executing the XSL Transformations (XSLT) engine comprises the step of copying annotations of the transformation stylesheet to the document, and wherein the annotations include a mapping back to locations within the transformation stylesheet.

8. A machine readable medium on which are provided machine instructions executable by a computing device, for carrying out the steps of claim 1.

9. A system for displaying data in a document according to a transformation stylesheet, and enabling a modification to the document to automatically update the transformation stylesheet, comprising:
   (a) a memory in which are stored machine instructions;
   (b) a display that is capable of displaying documents; and
   (c) a processor that is coupled to the memory and to the display, said processor executing the machine instructions, which cause the processor to carry out a plurality of functions, including:
      (i) associating the data with the document;
      (ii) determining a structure of the data;
      (iii) applying a transformation stylesheet that corresponds to the determined structure, wherein the transformation stylesheet defines at least one of a structure and a format for displaying the data;
      (iv) annotating the transformation stylesheet to create an annotated transformation stylesheet;
      (v) transforming the data according to the annotated transformation stylesheet to generate a data view for the document that is encoded to be compatible with a coding of the document and to include one or more annotations that respectively map one or more locations within the document to corresponding one or more locations in the transformation stylesheet; and
      (vi) rendering the data view for the document to display the data;
      (vii) enabling a user to modify the document; and
      (viii) automatically updating the transformation stylesheet in correspondence with a modification made by the user to the document, so that the transformation stylesheet is automatically changed in a manner corresponding to the modification made by the user to the document.

10. The system of claim 9, wherein the transformation stylesheet is in accord with an extensible Stylesheet Language (XSL) specification.

11. The system of claim 9, wherein the machine instructions further cause the processor to carry out the functions of:
   (a) enabling the user to select a data source that includes the data; and
   (b) inserting a reference to the data source into the document.

12. The system of claim 11, wherein the machine instructions further cause the processor to provide a tag having a value that defines the location of the node.

13. The system of claim 9, wherein the machine instructions further cause the processor to carry out the functions of:
   (a) determining whether a node in the transformation stylesheet is a top level element, wherein a top level element is a direct child of a root element of the transformation stylesheet;
   (b) if the node is not a top level element, determining a location of the node in the transformation stylesheet, wherein the location of the node is relative to the root element in a tree structure representing all nodes comprising the transformation stylesheet;
   (c) if the node is not a top level element, inserting into the transformation stylesheet an annotation indicating the location of the node; and (d) repeating the previous steps (a) through (c) for each node in the transformation stylesheet.

14. The system of claim 9, wherein the machine instructions further cause the processor to execute an XSL Transformations (XSLT) engine that automatically transforms data according to the transformation stylesheet, into the encoding that is compatible with the coding of the document.

15. The system of claim 14, wherein the machine instructions further cause the processor to copy annotations of the transformation stylesheet to the document, and wherein the annotations include a mapping back to locations within the transformation stylesheet.

16. A method for automatically updating a transformation stylesheet in response to a modification to a document that is annotated to map to the transformation stylesheet, comprising the steps of:
   (a) identifying any document annotations that are affected by the modification to the document and which have been included in the document as a result of applying the transformation stylesheet in producing the document; and
   (b) automatically translating the document annotations into a code compatible with the transformation stylesheet to modify the transformation stylesheet consistent with the modification to the document, so that the transformation stylesheet is automatically changed in a manner corresponding to the modification made by the user to the document.

17. The method of claim 16, wherein the transformation stylesheet includes at least one template that defines at least one of a structure and format of the document, further comprising the steps of:
   (a) identifying a template that is affected by the modification to the document; and
   (b) updating the template that was identified to reflect the modification to the document, to produce a modified template.

18. The method of claim 16, wherein the step of identifying any document annotations comprises the steps of:
   (a) determining a change region of the document based on a canonicalization sequence of changes to the document that include the modification, wherein the canonicalization sequence is created by manipulations of the document with an editor;
   (b) determining a common ancestor node of the change region from a data tree structure of nodes comprising the document;
   (c) determining a template body annotation node of the document that includes the common ancestor node, the common ancestor node being one of the template body annotation node and a descendent of the template body annotation node; and
   (d) determining all nodes encompassed by the template body annotation node.

19. The method of claim 16, wherein the step of translating the document annotations comprises the steps of:
   (a) recognizing a document annotation associated with a transformation node;
   (b) converting each document annotation affected by the modification into code compatible with the transformation stylesheet; and
   (c) modifying each transformation node in the transformation stylesheet with the code of the previous step to produce a modified transformation template corresponding to the modification of the document.

20. The method of claim 16, wherein the step of identifying the template comprises the steps of:
   (a) evaluating the document annotations to determine a sequence of branches from a root node of the transformation stylesheet along a data tree structure of nodes comprising the transformation stylesheet; and
   (b) traversing the branches of the data tree structure according to the sequence to identify a node in the data tree structure corresponding to the template.

21. The method of claim 16, wherein the transformation stylesheet is encoded in accord with an eXtensible Stylesheet Language (XSL) specification.

22. The method of claim 16, wherein the document is encoded in accord with a Hypertext Markup Language (HTML) specification.

23. The method of claim 16, further comprising the step of correcting the document as necessary to ensure that the document is well formed before the step of identifying any document annotations that are affected by the modification.

24. A machine readable medium on which are provided machine instructions executable by a computing device, for carrying out the steps of claim 16.

25. A system for automatically updating a transformation stylesheet in response to a modification to a document that is annotated to map to the transformation stylesheet, comprising:
   (a) a memory in which are stored machine instructions;
   (b) a display that is capable of displaying documents; and
   (c) a processor that is coupled to the memory and the display, said processor executing the machine instructions, which cause the processor to carry out a plurality of functions, including:
      (i) identifying any document annotations that are affected by the modification to the document and which have been included in the document as a result of applying the transformation stylesheet in producing the document; and
      (ii) automatically translating the document annotations into a code compatible with the transformation stylesheet to modify the transformation stylesheet consistent with the modification to the document, so that the transformation stylesheet is automatically changed in a manner corresponding to the modification made by the user to the document.

26. The system of claim 25, wherein the transformation stylesheet includes at least one template that defines at least one of a structure and format of the document, and wherein the machine instructions further cause the processor to carry out the functions of:
   (a) identifying a template that is affected by the modification to the document; and
   (b) updating the template that was identified to reflect the modification to the document, to produce a modified template.

27. The system of claim 25, wherein the machine instructions further cause the processor to:
   (a) determine a change region of the document based on a canonicalization sequence of changes to the document that include the modification, wherein the canonicalization sequence is created by manipulations of the document with an editor;
   (b) determine a common ancestor node of the change region front a data tree structure of nodes comprising the document;
   (c) determine a template body annotation node of the document that includes the common ancestor node, the common ancestor node being one of the template body annotation node and a descendent of the template body annotation node; and (d) determine all nodes encompassed by the template body annotation node.

28. The system of claim 25, wherein the machine instructions further cause the processor to:

(a) recognize a document annotation associated with a transformation node;

(b) convert each document annotation affected by the modification into code compatible with the transformation stylesheet; and (c) modify each transformation node in the transformation stylesheet with the code of the previous step to produce a modified transformation template corresponding to the modification of the document.

29. The system of claim 25, wherein the machine instructions further cause the processor to:

(a) evaluate the document annotations to determine a sequence of branches from a root node of the transformation stylesheet along a data tree structure of nodes comprising the transformation stylesheet; and (b) traverse the branches of the data tree structure according to the sequence to identify a node in the data tree structure corresponding to the template.

30. The system of claim 25, wherein the transformation stylesheet is encoded in accord with an eXtensible Stylesheet Language (XSL) specification.

31. The system of claim 25, wherein the document is encoded in accord with a Hypertext Markup Language (HTML) specification.

32. The system of claim 25, wherein the machine instructions further cause the processor to correct the document as necessary to ensure that the document is well formed before the step of identifying any document annotations that are affected by the modification.

* * * * *